United States Patent [19]

Lafuze

[11] 4,295,085

[45] Oct. 13, 1981

[54] PHASE LOCK LOOP COMMUTATION POSITION CONTROL AND METHOD

[75] Inventor: David L. Lafuze, Endicott, N.Y.

[73] Assignee: General Electric Company, Binghamton, N.Y.

[21] Appl. No.: 42,432

[22] Filed: May 25, 1979

[51] Int. Cl.³ .......................... H02P 5/28; H02P 7/36

[52] U.S. Cl. .................................. 318/721; 318/722; 318/723; 318/724; 318/138; 318/254

[58] Field of Search ............... 318/721, 722, 723, 724, 318/138, 254, 254 A

[56] References Cited

U.S. PATENT DOCUMENTS

| | | | |
|---|---|---|---|
| 2,715,202 | 8/1955 | Turner et al. | 318/721 |
| 3,584,276 | 6/1971 | Ringland et al. | 318/721 |
| 3,601,678 | 8/1971 | Abraham et al. | 318/254 |
| 3,908,130 | 9/1975 | La Fuze | 318/254 A |
| 3,937,974 | 2/1976 | La Fuze | 318/138 |
| 3,940,669 | 2/1976 | Tsuboi et al. | 318/721 |
| 4,060,753 | 11/1977 | Okuyama et al. | 318/254 |
| 4,125,796 | 11/1978 | Nagase et al. | 318/254 |

*Primary Examiner*—J. V. Truhe
*Assistant Examiner*—Eugene S. Indyk
*Attorney, Agent, or Firm*—Arthur E. Bahr; I. David Blumenfeld; Irving M. Freedman

[57] ABSTRACT

A phase lock loop commutation position control and method for a drive system for a DC field motor having a rotor and a plurality of stator windings is disclosed. Electric power is supplied to the stator windings in accordance with gating signals. The gating signals are generated in accordance with timing signals, which are provided in response to a clocking signal. A position signal is furnished as a function of the position of the rotor with respect to a preselected stator position. An error signal is generated proportionally to the phase difference between a preselected timing signal and the position signal. The clocking signal is produced as a function of the error signal. The invention also can include a shift signal produced as a function of the rotation of the rotor. The shift signal is added to the error signal effectively to cause the preselected timing signal to be advanced with respect to the position signal. In addition, a shift signal can be produced as a function of the current level of the electric power, and this shift signal can be added to the error signal effectively to cause the preselected timing signal to be advanced with respect to the position signal. The invention can also cause the timing signals to be provided for generating the gating signals in accordance with the position signal when the rotation of the rotor is below a preselected value.

43 Claims, 15 Drawing Figures

FIG 6
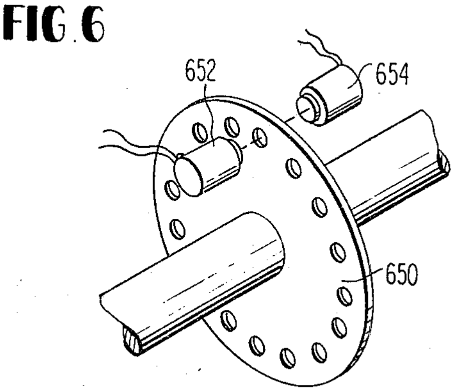
FIG 7
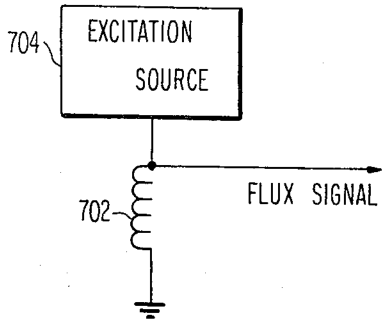
FIG 1 DC SHUNT MACHINE
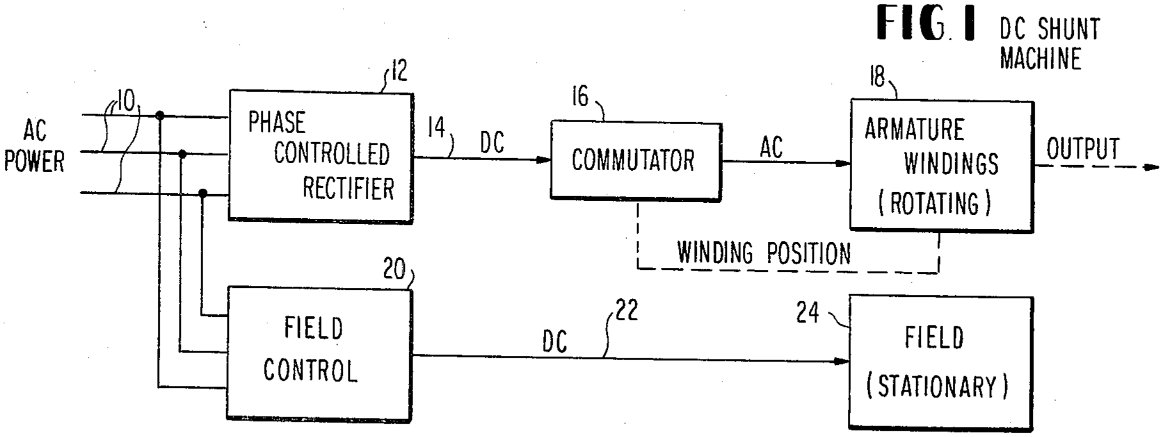
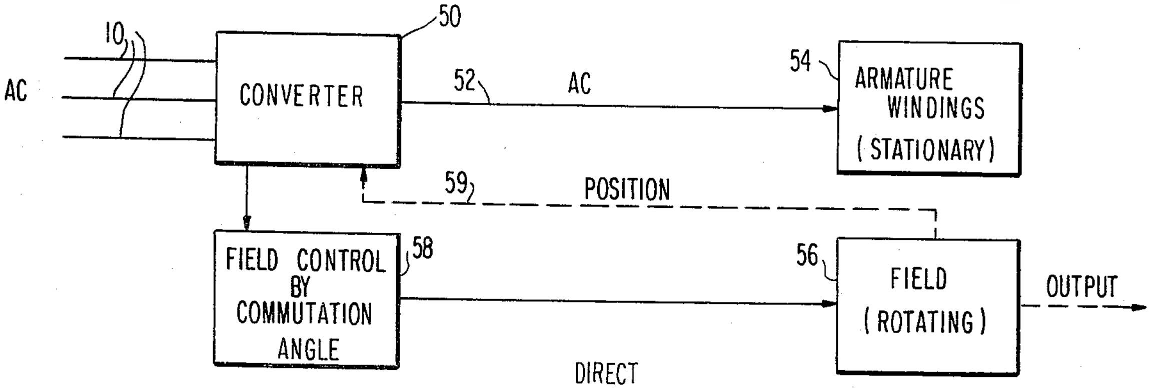
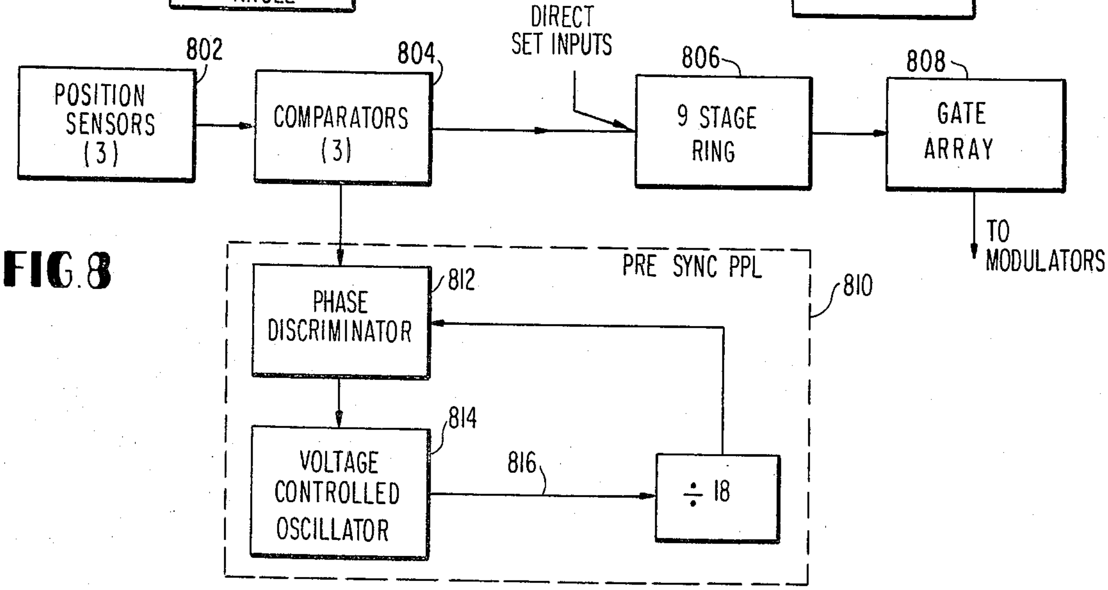
FIG 8

PHASE LOCK LOOP COMMUTATION POSITION CONTROL AND METHOD

The Government has rights in this invention pursuant to Contract No. F33615-74-C-2037 awarded by the Department of the Air Force.

BACKGROUND OF THE INVENTION

1. Field Of The Invention

The apparatus and method of the present invention relates generally to a drive system for a DC field motor having a rotor and a plurality of stator windings and, more particularly, relates to a phase lock loop commutation position control and method for such a drive system. The present invention has particular applicability for use in a variable speed constant frequency (VSCF) motor/generator system used in an aircraft environment.

2. Description Of The Prior Art

Drive systems and methods for a DC field motor having a rotor and a plurality of stator windings are known. Representative of these are the systems shown in U.S. Pat. No. 3,937,974 and U.S. Pat. No. 3,908,130 to David L. Lafuze, the inventor of the present application, assigned to the General Electric Company, and incorporated by reference herein.

Such drive systems, however, exhibit the following deficiencies. Both systems accomplish phase shifting in accordance with rotation level and/or current level using analog techniques. The range of the possible phase shift using analog techniques is, however, extremely limited. It is difficult to achieve equal phase shifts with respect to each position sensor because the shift is dependent upon the wave amplitude and shape of the output signals of the Hall probes. Mechanical positioning problems with the Hall position probes results in additional position errors, which cannot be readily compensated. Compensation for such position errors requires individual adjustment of the circuitry sensing each probe output, which is difficult to achieve technically and expensive to perform. Hall probes are the contemplated types of position sensors.

Such systems are practically limited to three- or six-phase machines, with six-phase machines being technically equivalent to three-phase machines because of the diametric phase relationships. The analog outputs of the position sensors operate in an open loop system so that performance is highly dependent on the characteristics of the circuit components. No feedback loops are used in such systems to compensate automatically and continuously for component variations and/or the mechanical errors of component positioning. Because no feedback is used, such systems do not employ discriminators. The systems are primarily analog and do not use any type of ring counters or registers to generate timing signals used to control the generation of the thyristor gating signals. Consequently, such systems do not use clocking signal sources, such voltage controlled oscillators, to generate clocking signals for ring counters or shift registers. Such systems employed complex motors with wound rotating fields and means to excite the fields from the stator. Such systems do not use machines employing solid rotors fabricated with permanent magnets, especially permanent magnets of the samarium cobalt type.

Such systems only produce the same number of position signals as the number of position sensors. They do not provide intermediate position signals using either a phase lock loop approach or a phasor addition approach.

Such drive systems have particular application in VSCF motor/generator systems used in aircraft environments. Representative of conventional VSCF power generation systems are the systems disclosed in the following U.S. patents, whose teachings are incorporated herein by reference:

| | | |
|---|---|---|
| Re 26,630 | Peaslee | issued 7/15/69 |
| 3,152,297 | Peaslee | issued 10/6/64 |
| 3,289,070 | Caldwell et al | issued 11/29/66 |
| 3,320,514 | Lawrence | issued 5/16/67 |
| 3,400,321 | Lafuze | issued 9/3/68 |
| 3,419,785 | Lafuze | issued 12/31/68 |
| 3,593,106 | Lafuze | issued 7/13/71 |
| 3,641,418 | Lafuze | issued 2/8/72 |
| 3,745,471 | Lafuze | issued 7/10/73 |
| 3,873,928 | Lafuze | issued 3/25/75 |
| 3,902,073 | Lafuze | issued 8/26/75 |
| 3,908,161 | Messenger | issued 9/23/75 |

OBJECTS OF THE INVENTION

It is an object of the present invention to provide a phase lock loop commutation position control and method for a drive system for a DC field motor having a rotor and a plurality of stator windings.

It is another object of the present invention to provide a phase lock loop commutation position control and method which produces a wide range of possible phase shifts.

It is a further object of the present invention to provide a phase lock loop commutation position control and method which produces a phase shift as a function of the motor rotation and/or the current amplitude of the electric power to the stator windings of the motor.

It is another object of the present invention to provide a phase lock loop commutation position control and method where the timing signals are generated in accordance with the average mechanical position of the position sensors.

It is a further object of the present invention to provide a phase lock loop commutation position control and method which derives intermediate position signals for stator windings greater than the number of position sensors.

It is another object of the present invention to provide a phase lock loop commutation position control and method which causes the gating signals to be generated directly in accordance with the position signals when the rotation of the motor is at a low level.

It is a further object of the present invention to provide a phase lock loop commutation position control and method for controlling a motor having at least two phases and/or at least one pole pair.

It is another object of the present invention to provide a phase lock loop commutation position control and method where the phase difference between the timing signals and corresponding position signals is continuously measured, and these phase differences are used to produce a desired system output function.

It is a further object of the present invention to provide a phase lock loop commutation position control and method using ring counters or shift registers which are gated in response to a clocking signal supplied by a clocking signal source, such as a voltage controlled oscillator.

It is another object of the present invention to provide a phase lock loop commutation position control and method which can effectively reduce the field of the motor created by permanent magnets, especially of the samarium cobalt type.

It is a further object of the present invention to provide a phase lock loop commutation position control and method which derives intermediate position signals using phasor addition of the output signals from the position sensors.

It is another object of the present invention to provide a phase lock loop commutation position control and method which provides for a gradual transition from a direct set mode of operation to the normal phase lock loop mode of operation.

It is a further object of the present invention to provide a phase lock loop commutation position control and method having applicability in a VSCF motor/generator system.

These and other objects are achieved by the control and method of the present invention.

SUMMARY OF THE INVENTION

A phase lock loop commutation position control and method for a drive system for a DC field motor having a rotor and a plurality of stator windings as disclosed. Electric power is supplied to the stator windings in accordance with gating signals. The gating signals are generated in accordance with timing signals, which are provided in response to a clocking signal. A position signal is furnished as a function of the position of the rotor with respect to a preselected stator position. An error signal is generated proportionally to the phase difference between a preselected timing signal and the position signal. The clocking signal is produced as a function of the error signal. In this way, the phase lock loop controls the supplying of the electric power to the stator windings in accordance with the position of the rotor.

A preferred embodiment for implementing this aspect of the present invention comprises a source of multiphase electric power and a cycloconverter connected to the source of multiphase electric power for selectively supplying the electric power to the stator windings in accordance with the gating signals. The cycloconverter includes banks of oppositely poled conduction controlled rectifying devices. The gating signals are generated by logic means in response to the timing signals. The timing signals either can be provided by a register or a ring counter in response to the clocking signal. The ring counter can also include apparatus for correcting erroneous timing signals. The position signal can be furnished in one of several fashions. For example, the position signal can be furnished in accordance with the pole flux of the DC field motor at the preselected stator position by, for example, a Hall probe or a flux coil. Alternately, the position signal can be furnished by an indicator mounted on the rotor having sensible means mounted at fixed positions thereon and a means for sensing the sensible means and for providing the position signal in accordance with the sensing of the sensible means. The error signal can be provided by a logic circuit having inputs effectively connected to the preselected timing signal and the position signal, respectively, and an output providing the error signal proportional to the phase difference between the preselected timing signal and the position signal. The clocking signal can be provided by a voltage controlled oscillator having an input effectively connected to the error signal and producing the clocking signal at an output in response to the error signal.

In another aspect of the present invention, a shift signal can be produced as a function of the rotation of the rotor. This shift signal can be added to the error signal effectively to cause the preselected timing signal to be advanced with respect to the corresponding position signal. A preferred embodiment for implementing this aspect of the present invention comprises a logic circuit responsive to the position signal for generating a serial pulse train having a frequency proportional to the rotation of the rotor. The serial pulse train is frequency divided to produce an output signal. An amplifier produces the shift signal as a function of the output signal.

In a further aspect of the present invention, a shift signal is generated as a function of the current level of the electric power. This shift signal is added to the error signal effectively to cause the preselected timing signal to be advanced with respect to the position signal. A preferred embodiment for implementing this aspect of the present invention comprises a current sensing means for supplying a current signal proportional to the current level of the electric power. An amplifier provides the shift signal as a function of the current signal when the level of the current signal exceeds a preselected value.

In a further aspect of the present invention, the timing signals are provided in accordance with the position signal when the rotation of the rotor is below a preselected value. Two preferred embodiments for implementing this aspect of the present invention are disclosed. One embodiment comprises a logic circuit for generating a serial pulse train having a frequency proportional to the rotation of the rotor. A preset enabled circuit provides a preset enable signal when the integral of the serial pulse train exceeds a preselected value. A timing signal is provided by either a register or a ring counter in accordance with the position signal in response to the preset enable signal.

Another embodiment of this aspect of the present invention provides a gradual transition from the direct set mode to the normal phase lock loop mode as the rotation of the motor increases. The ring counter or shift register has two stages at each position where the timing signal is provided in accordance with the corresponding position signal in the direct set mode. Each of these two associated stages has the same data input, but the output of the one of each pair that can be set provides the output to the ring or counter system for that position. The timing signals are derived from the outputs of the ring or counter except for the parallel-connected stages whose outputs cannot be set. The outputs of these stages are used as input signals to phase comparators, which provide error signals indicative of the phase difference between these timing signals and the corresponding position signals. These error signals are effective to control the clocking signal of a clocking signal source, which clocking signal being effective to control the furnishing of the timing signals by the ring or gate.

An additional aspect of the present invention is a counter means providing to the means for generating an error signal a signal indicative of the preselected timing signal when the rotation of the rotor is below a preselected value.

In a further aspect of the present invention, a shift signal is generated as a function of the phase difference between the preselected timing signal and the position signal. The shift signal is added to the error signal effectively to cause the preselected timing signal to be advanced with respect to the position signal. In one preferred embodiment of this aspect of the present invention, a logic circuit having inputs effectively connected to the preselected timing signal and the position signal, respectively, provides on an output a control signal proportional to the phase difference between the preselected timing signal and the position signal. An amplifier provides the shift signal as a function of the control signal.

The phase lock loop commutation position control and method of the present invention has particular applicability for use with a VSCF motor/generator system, typically used in an aircraft environment.

BRIEF DESCRIPTION OF THE DRAWINGS

FIG. 1 in the top half shows in block diagram form the functional elements of a DC shunt machine, and in the bottom half shows in block diagram form the functional elements of a machine operated in an analogy of a brushless DC shunt machine.

FIG. 6 shows an alternate version for producing the position signals where an indicator means is mounted on the rotor and a means for sensing the sensible elements on the indicator means is provided adjacent thereto so as to produce a position signal.

FIG. 7 illustrates an alternate version for producing the position signal utilizing a flux coil.

FIG. 8 is a block diagram of the direct set or low speed mode aspect of the present invention.

DETAILED DESCRIPTION OF THE INVENTION

The phase lock loop commutation position control and method of the present invention for a drive system for a DC field motor having a rotor and a plurality of stator windings is now described. The present invention is based on the use of a DC field motor which is operated as an analogy to a brushless DC shunt machine.

Figure 2:
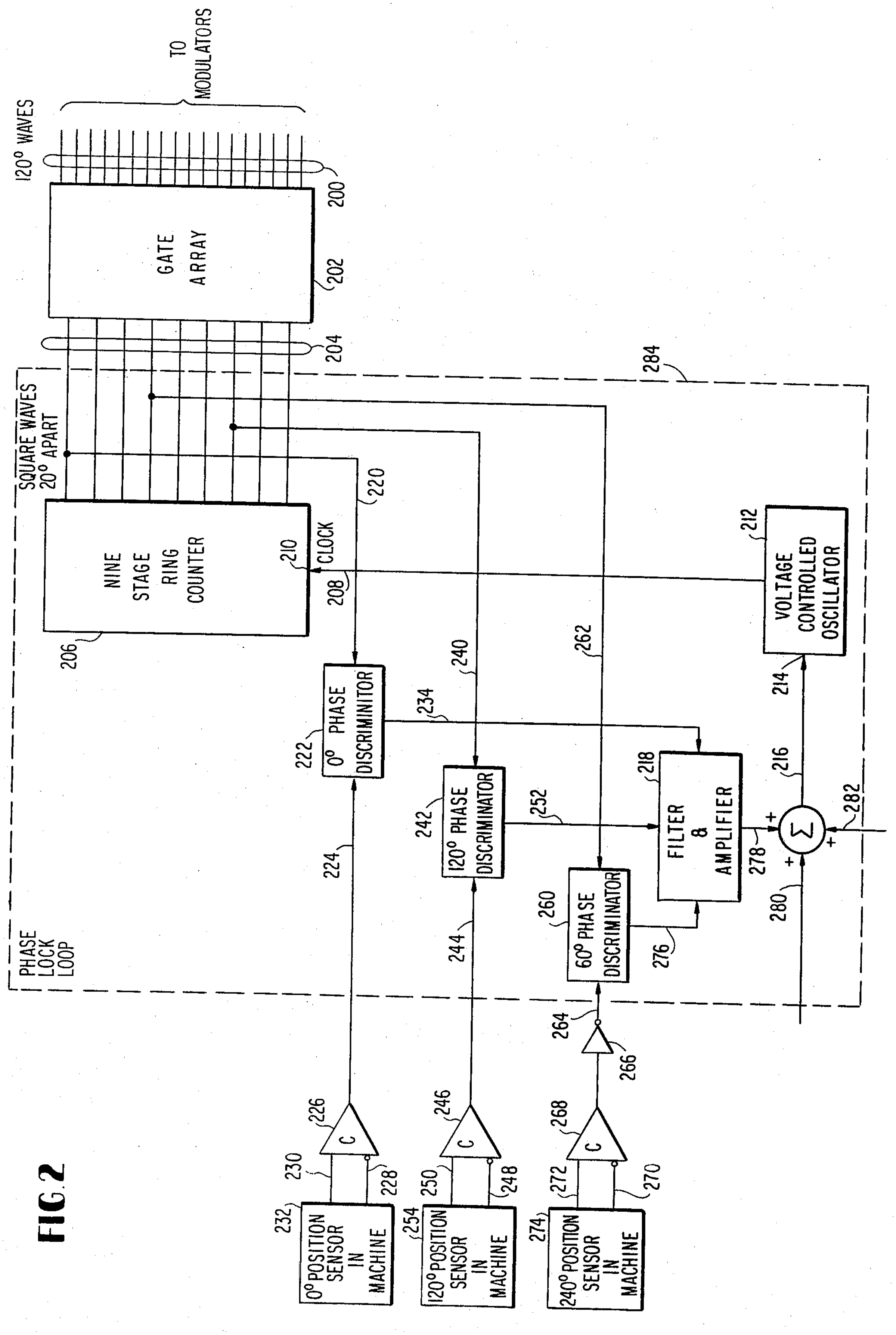
FIG. 2 illustrates in block diagram form an embodiment of the basic version of the phase lock loop commutation position control and method of the present invention.

FIG. 1 shows this analogy block diagram form. The top half of FIG. 1 shows the functional elements of a DC shunt machine of conventional design. AC power from a source (not shown) is provided on lines 10 to a phase controlled rectifier circuit 12, which provides a DC output signal on a line 14 in accordance with gating pulses (not shown) provided to the phase controlled rectifier 12. The DC signal on line 14 is supplied to the commutator 16 of the brush and commutator machine. The rotation of the commutator 16 causes the switching action produced by the brush and the commutator so as to generate AC power provided to the rotating armature windings 18 of the machine. The rotational position of the armature windings 18 is directly related to the switching action produced by the brush (not shown) and the commutator 16. The AC power on lines 10 is also provided to a field control 20, which generates a DC signal on a line 22. The DC signal on line 22 is applied to the stationary field 24 of the motor. As is apparent to those skilled in the art, the operation of the DC shunt machine of FIG. 2 is well known.

The control strategy of the present invention is to operate the machine as an analogy of a brushless DC shunt machine, as shown by the lower block diagram of FIG. 1. In this analogy, the armature or stator is now stationary and the field is rotating, in contrast to the rotating armature of the brush and commutator machine described above. This method of operation is chosen over synchronous motoring because a nearly optimum torque angle is always possible and the hazard of loss of synchronization of the motor is eliminated. The penalty is that position sensing is required if high torque at very low speeds or rotor rotations is needed. At higher rotations, the rotor position can be determined from the machine back EMF voltage and current, as is discussed below in detail.

Referring again to the lower block diagram of FIG. 1, AC power from a source (not shown) is provided on lines 10 to a converter 50, which provides AC electric power on output lines 52 in accordance with gating pulses (not shown in FIG. 1) to converter 50. The AC electric power on lines 52 is applied to the stationary armature or stator windings 54 of the motor. The field generated by the rotating rotor 56 of the motor can be controlled by the commutation angle 58 of the conduction controlled rectifying devices of converter 50 used to convert the AC power on lines 10 to the AC electric power on output lines 52.

The conduction controlled rectifying devices of converter 50 can take any suitable form, such as ignitrons and excitrons, and thyristors, but the thyristor is the preferred form. For ease of illustration hereinafter, the conduction controlled rectifying devices will be referred to as thyristors.

The thyristors of converter 50 simultaneously perform three functions. First, the thyristors act as the commutator, switching currents in and out of the stator or armature windings 54. Feedback from the rotor position sensors, as indicated by dashed-line 58, replaces the geometric relationship of the brush and commutator bar position of the DC shunt machine. Second, the thyristors are phase controlled with respect to the AC power supply on lines 10 to control the current amplitude of the AC electric power on lines 52. Finally, the thyristor control takes over the function of field control at high motor rotation when the machine back EMF approaches the supply voltage on line 10. As is explained in detail below, this field control is done by phase advancing the thyristors with respect to the rotor position, so that the machine draws more reactive current which reduces the effective field and back EMF. By phase advancing, more real power can then flow into the machine so as to maintain optimum torque.

For purposes of illustration only, the brushless DC shunt machine used with the phase lock loop commutation position control and method of the present invention is assumed to have nine phases and seven pole pairs on the rotor (which means that the rotor has fourteen poles). Obviously, the brushless DC shunt machine used with the present invention can have two or more phases and one or more pole pairs.

A block diagram of the basic elements of a preferred embodiment of the present invention where the brushless DC shunt machine has nine stator phases is shown in FIG. 2. No attempt is made to have the converter 50 (FIG. 1) to supply the brushless shunt machine with sinusoidal AC voltages on line 52 to the stator windings 54, though this is possible at low rotor rotations. The AC voltage on lines 52 is the familiar quasi-square wave which has 120 degree constant voltage intervals spaced by 60 degree zero voltage intervals. Thus, in a nine-phase machine, six phases always have power flowing through them at any instant in time.

As is well known, converter 50 can take the form of a cycloconverter as is shown in U.S. Pat. Nos. 3,908,130 and 3,937,974 incorporated above by reference. Converter 50 is made up of three cycloconverters, each having a positive bank and a negative bank. Each bank has nine thyrsitors because the machine has nine phases. Thus, eighteen lines 200 must be provided to each of the cycloconverters of converter 50 in order to effect the desired phase controlled gating of the respective thyristors in each cycloconverter. It should be understood that the cycloconverters function as linear amplifiers in converting the AC power provided on lines 10 into the desired electric power on lines 52 (FIG. 1). Thus, the present invention is not limited to having converter 50 be in the form of a cycloconverter, but also encompasses other types of modulator arrangements which can provide the desired electric power to the machine in response to the gating signals on lines 200.

A gate array 202, as shown in FIG. 2, provides on lines 200 the respective eighteen gating signals to converter 50 (shown in FIG. 1). The number of gating signals and the number of lines 200 depends on the number of phases of the machine. In the present embodiment, the eighteen gating signals each have 120 degree conduction intervals spaced by 240 degree zero intervals, as shown by the eighteen gate array waveform traces plotted on FIG. 3. The horiziontal axis of each of the eighteen gate array waveform traces of FIG. 3 corresponds to a full 360 electrical degree cycle of the machine voltages, and the vertical axis of each of the traces corresponds to the amplitude level of the plotted signal. As is seen, adjacent gating signals are spaced by 20 electrical degree intervals.

Referring again to FIG. 2, gate array 202 generates the eighteen gating signals on lines 200 in response to nine timing signals supplied on nine respective lines 204 to the inputs of gate array 202. The timing signals are square waves having 180 electrical constant voltage intervals spaced by 180 electrical degree zero voltage intervals. Adjacent timing signals are spaced by 20 electrical degrees, as shown by the nine ring timing signal traces (no shift) of FIG. 3. The timing signals on lines 204 are provided by a logic stage 206, which is one preferred form is a nine-stage ring counter. Another preferred form for logic stage 206 is that of a shift register. In either form, the timing signals are provided on the respective lines 204 in accordance with a clocking signal on a line 208 provided to a clocking signal input 210 of logic stage 206.

The clocking signal on line 208 is supplied by a clocking signal source 212, which is one preferred form is that of a voltage controlled oscillator. The clocking signal on line 208 is furnished by the voltage controlled oscillator 212 in accordance with an error signal furnished to an input 214 of the clocking signal source by a line 216.

In the most basic form of the present invention, the error signal on line 216 is the output signal from a filter and amplifier stage 218. Filter and amplifier stage 218 derives the error signal in accordance with three input signals.

The first input signal to filter and amplifier stage 218 is a signal representative of the phase difference between the zero degree timing signal and the zero degree position signal. The zero degree timing signal is obtained from the appropriate timing signal line 204, and is applied via a line 220 to the first input of a zero degree phase discriminator stage 222. A second input of the zero degree phase discriminator stage 222 is connected to an output line 224 of a comparator 226. The inverting and non-inverting inputs 228 and 230, respectively, of comparator 226 are connected to a zero degree position sensor 232 mounted in the machine.

There are many suitable forms for the zero degree position sensor 232. The most preferred form is that of a Hall probe (see FIG. 5) mounted in the machine for sensing leakage flux at the end of the rotor so as to provide an output voltage signal indicative of the rotor position in terms of a preselected zero degree rotor position in the motor. An alternate form for sensor 232 is that of a flux coil 702 and associated excitation source 704, which also senses the leakage flux at the end of the rotor and provides an output signal indicative of the rotor position with respect to the zero degree preselected stator position. This form for sensor 232 is shown in FIG. 7. An alternate form for sensor 232 is that of a indicator means mounted on the rotor and having a sensible means at fixed positions thereon. The sensible means are sensed so as to provide a position signal in accordance with the position of the rotor with respect to the preselected zero degree stator position. A suitable form for this embodiment of sensor 232, for example, is that of a code wheel 650 with a light emitter 652 and receiver 654, as shown in FIG. 6.

Figure 3:
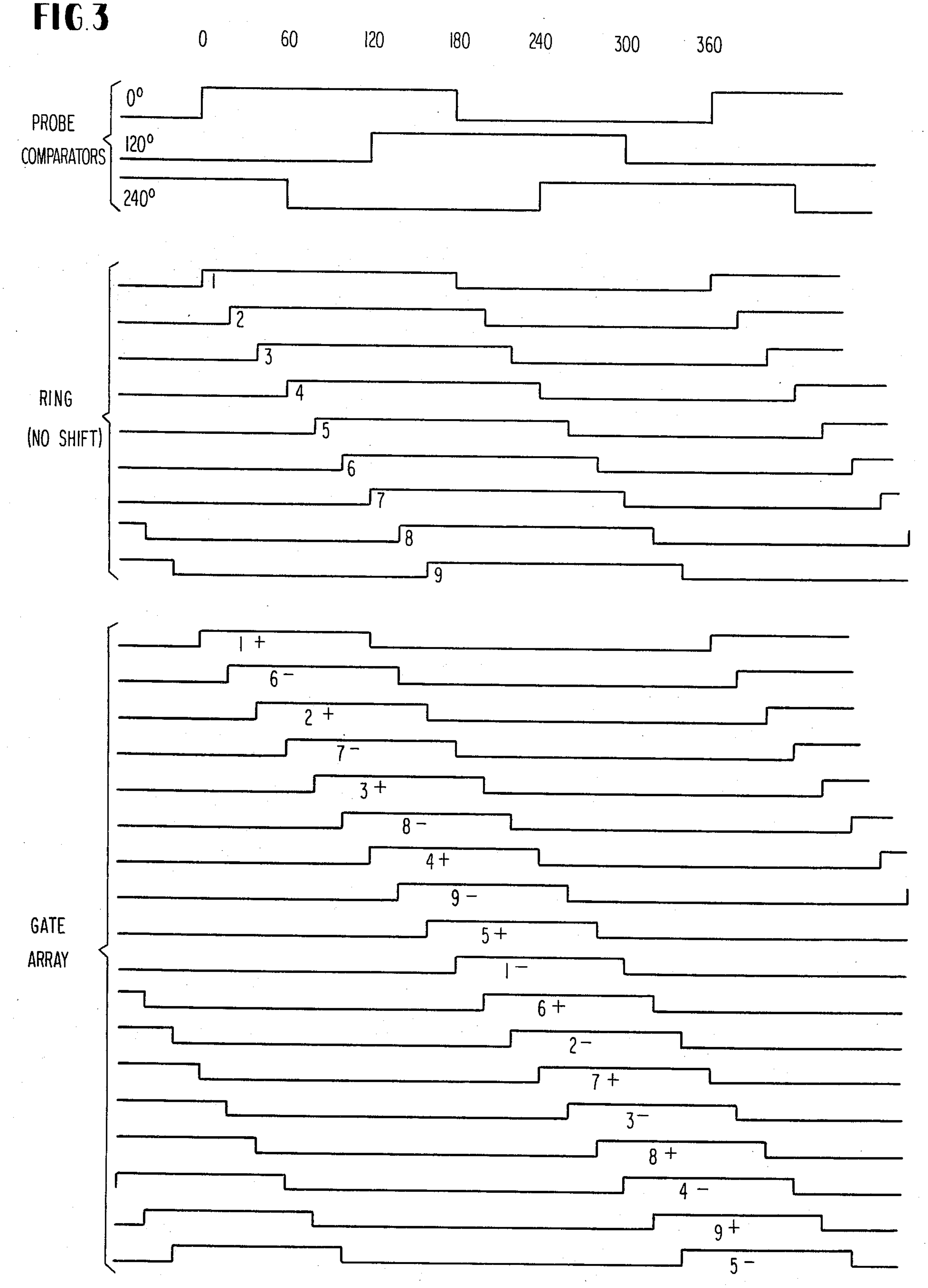
FIG. 3 plots the outputs of the position probe comparators, the timing signals, and the gating signals of the basic version of the present invention of FIG. 2, with amplitude plotted on the vertical axis of each trace and with electrical degrees plotted on the horizontal axis of each trace for the system operated in the normal phase lock loop motoring mode.

In either of the above forms for sensor 232, comparator 226, as shown in FIGS. 2 and 3, provides an output or first signal on line 224 that indicates the position of the rotor with respect to the preselected zero degree stator position. For example, the output signal on line 224 can be made to go to the high state when the rotor passes the preselected zero degree position and can be made to go to the low state when the rotor has advanced by a 180 electrical degrees with respect to this zero degree stator position.

Zero degree phase discriminator 22 provides on a line 234 a signal indicative of the phase difference between the zero degree timing signal on line 220 and the zero degree position signal on line 224.

Similarly, the second input signal applied to filter and amplifier stage 218 is a signal indicative of the phase difference between the 120 degree timing signal and the 120 degree position signal. The 120 degree timing signal is derived from the suitable timing signal line 204 and is applied via a line 240 to an input of a 120 degree phase discriminator stage 242. A second input of 120 degree phase discriminator stage 242 is supplied via a line 244 with a signal indicative of the rotor position with respect to a preselected 120 electrical degree stator position. This 120 electrical degree position signal is provided on line 244 by a comparator 246 having an inverting and non-inverting inputs 248, 250, respectively. These inputs 248, 250 are connected to a 120 electrical degree position sensor 254, which can take any of the suitable forms used for the zero electrical degree position sensor 232 discussed above. The signal indicative of the phase difference between the 120 degree timing signal and the 120 degree position signal is provided by the 120 degree phase discriminator 242 to the filter and amplifier stage 218 via a line 252.

The third and final input provided to filter and amplifier stage 218 is a signal indicative of the phase difference between the 60 degree timing signal and inverted version of a 240 degree position signal. It should be noted that the 240 degree position signal may be inverted to give the desired 60 degree position signal.

A 60 degree phase discriminator stage 260 has an input furnished with the 60 degree timing signal via a line 262 connected to the 60 degree timing line 204. Another input of 60 degree phase discriminator stage 260 is connected via a line 264 to the output of an inverter 266. The input of inverter 266 is connected to the output of a comparator 268, having an inverting and a non-inverting inputs 270, 272, respectively. The inverting input 270 and the non-inverting input 272 are connected to a 240 electrical degree position sensor 274, which provides a signal indicative of the position of the rotor with respect to a preselected 240 electrical degree stator position. The 240 degree position sensor 274 can take the form of any of the various types described with respect to the zero degree position sensor 232. The output from the 60 phase discriminator 260 on a line 276 is applied to the filter and amplifier stage 218.

Filter and amplifier stage 218, as discussed above, furnishes an error signal on an output line 278, which corresponds to the error signal on line 216 in the basic form of the present invention, as shown in FIG. 2. It should be noted, however, that a speed or rotation shift signal on a line 280, and a current shift signal or start current regulator on a line 282 can also be added to the error signal on line 216 so as to produce a desired phase advance, as is discussed in detail in the respective embodiments, as is discussed in detail in the respective embodiments below.

The circuit elements with dashed-line box 284 of FIG. 2 constitutes a phase lock loop for producing a commutation position control of the gating of the conduction controlled rectifying devices of converter 50.

The use of the phase lock loop of the present invention has several advantages. First, since the machine has nine phases, ideal tracking of the rotor would require nine position sensors. The use of the phase lock loop, however, allows only three position sensors to be used, with the remaining six positions being derived from these three position signals. The additional six positions are derived using the timing signals provided by the timing signal source, such as the nine-stage ring counter 206 shown in FIG. 2. By comparing the phase difference between the three timing signals and the respective three position signals, the phase lock loop can effectively derive the additional six position signals. A second advantage of the phase lock loop is that it averages the three position signal outputs. Because each mechanical degree in a seven-pole pair machine represents seven electrical degrees, accurate mechanical positioning of the position sensors is very difficult to achieve. It is apparent that the accuracy problem increases as the number of pole pairs of the machine increases. Thus, the averaging produced by the phase lock loop mitigates against the placement problems that would be present if the phase lock loop was not used. Finally, the phase lock loop makes it easy to shift electrically the angle of the condution controlled rectifying device switching. It will become apparent to a greater degree below that the ability to shift the phase of the timing signals with respect to the position of the rotor over a substantial angle is essential to get optimum torque, commutation, and field weakening, as the motor is accelerated from substantially zero rotation to full rotor rotation in the motoring mode.

Figure 5:
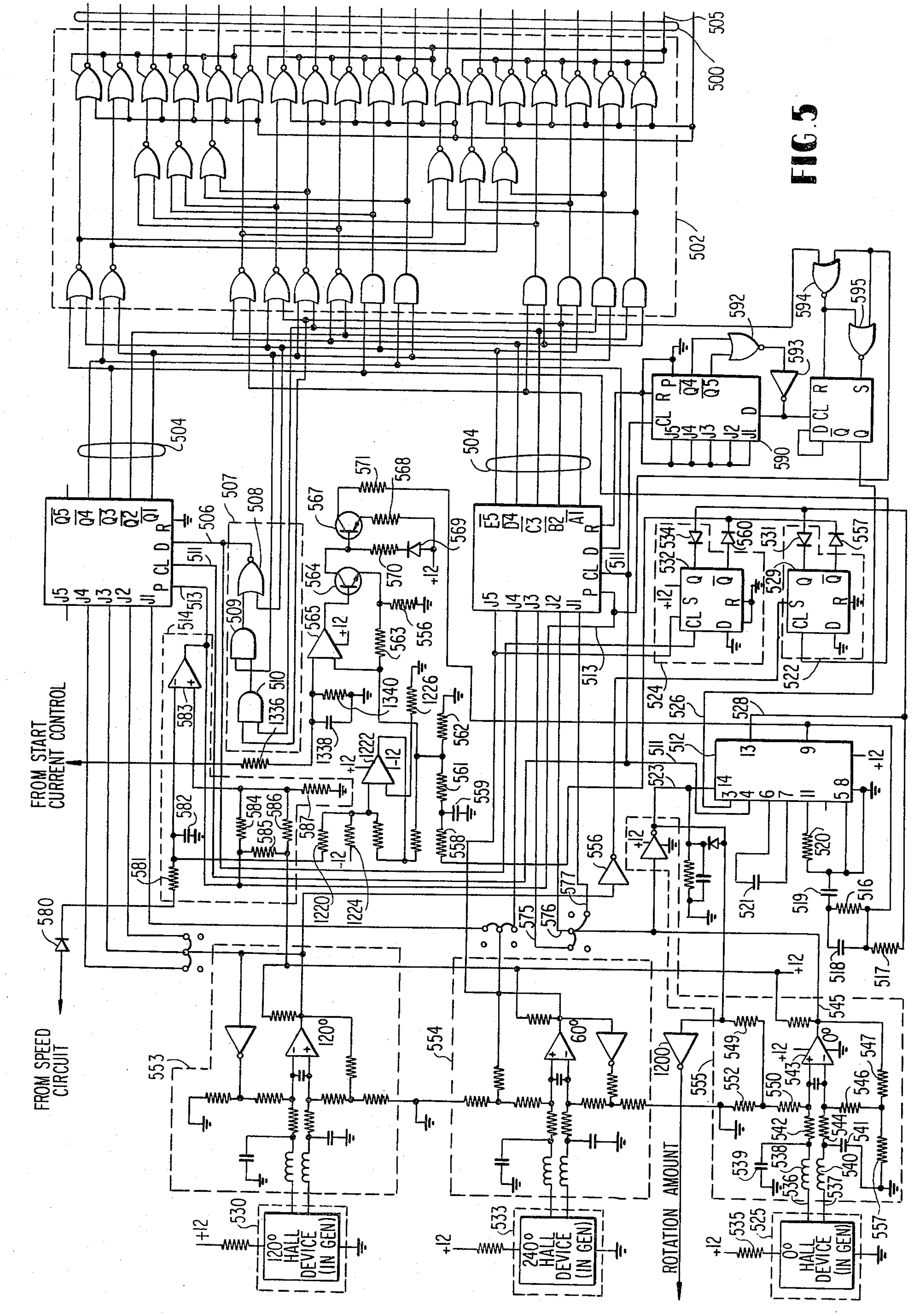
FIG. 5 presents in schematic form a mechanization of the basic version of the present invention along with portions of the mechanization of the other aspects of the present invention for a nine-phase machine where three position probes are used.

A preferred mechanization of the basic version of the present invention of FIG. 2 is shown in FIG. 5 and is now described. Gate array 202 is contained within dashed-line box 502 and includes a suitable number of logic devices connected to generate the eighteen gating signals on lines 500 in accordance with the timing signals provided on lines 504. Gate array 502 can take any suitable form that produces the desired gating signals in accordance with the timing signals. Of interest with respect to the embodiment shown within dashed-line box 502 is that the output gates for each of the eighteen gate signal lines 500 are tri-state NOR gates. When the signal on a tri-state line 505 is in the low state, for example, the eighteen NOR gates are either in the high or low electrical states depending upon the signals at their respective two inputs. However, when the tri-state signal on line 505 is in the high state, the output of each of the eighteen NOR gates is in the high impedance state. The ability to put the outputs of the NOR gates in the high impedance state is particularly important when the present invention is used in a motoring mode/VSCF generating mode system when the system is operating in the generating mode and it is desired to isolate gate array 502 from the generator functions of converter 50.

The timing signal source 206 which provides on lines 504 the respective 180 electrical degree timing signals in accordance with a clocking signal takes the form of a nine-stage ring counter in the circuit of FIG. 5. The nine-stage ring counter is made up of two CD4018A CMOS presettable divide by N counters, each having five Johnson-counter stages, $\overline{Q}$ outputs from each stage, and counter preset gating. The nine $\overline{Q}$ outputs providing the nine timing pulses are as follows: $\overline{B}$2 provides the zero electrical degree timing pulse; $\overline{C}$3 provides the 20 electrical degree timing pulse; $\overline{D}$4 provides the 40 electrical degree timing pulse; $\overline{E}$5 provides the 60 electrical degree timing pulse; $\overline{Q}$1 provides the 80 electrical degree timing pulse; $\overline{Q}$2 provides the 100 electrical degree timing pulse; $\overline{Q}$3 provides the 120 electrical degree timing pulse; $\overline{Q}$4 provides the 140 electrical degree timing pulse; and $\overline{A}$1 provides the 160 electrical degree timing pulse.

The reset (R) of each of the two CD4018A counters is connected to electrical ground. The data (D) input of the upper counter is connected via a line 506 to a circuit enclosed by dashed-line box 507, which corrects erroneous timing pulses which may be present in the nine-stage counter. Without correction of erroneous timing pulses, which can arise from any number of occurrences, such as transient voltages, improper gating of the conduction controlled rectifying devices in converter 50 would result and would detrimentally affect the system performance until the system was taken out of the motoring mode and the nine-stage ring counter was reloaded.

The erroneous timing signal stage 507 can take any suitable form. The form shown in FIG. 5 is that of a NOR gate 508, whose output is connected to the data input of the upper counter and whose inputs are respectively connected to the output of an AND gate 509 and to the 60 electrical degree timing pulse from $\overline{E}$5. The inputs of AND gate 509 are connected respectively to the output of an AND gate 510 and to the 80 electrical degree timing pulse from $\overline{Q}$1. The inputs of AND gate 510 are connected respectively to the 20 electrical degree timing pulse from $\overline{C}$3 and to the zero electrical degree timing pulse from $\overline{B}$2. In this fashion, the circuit 507 corrects for erroneous timing pulses each time the nine-stage ring counter makes a complete count through its nine stages.

The data (D) input of the low CD4018A counter is connected to the 140 electrical degree output $\overline{Q}$4 so as to form the ring counter arrangement.

The clock (CL) input of each of the CD4018A counters is connected via a line 511 to the clocking signal output of a voltage controlled oscillator 512, discussed below. The present enable (P) input of each of the CD4018A counters is connected via a line 513 to a preset enable signal source enclosed within dashed-line box 514. The preset enable circuit 514 provides a preset enable signal when the motor rotation is below a preselected value, for example, 500 rpm, as is discussed in detail below. The jam inputs (J1–J5) of each of the CD4018A counters allows the outputs of the counters to be preset when the preset enable signal is present on line 513. The function of the jam inputs will be discussed below, but for present purposes it should be assumed that the nine-stage ring counter is providing the timing signals to lines 504 in accordance with the clocking signal provided by the voltage controlled oscillator 512 on line 511.

Filter and amplifier stage 218 and voltage controlled oscillator stage 212 of FIG. 2 take the form of a CD4046A CMOS micropower phase-locked loop, designated by reference numeral 512 in FIG. 5. The error signal is supplied to the VCO input (pin 9) of stage 512 via a line 515. Line 515 is also connected to one side of a resistor 516 and to one side of a resistor 517. The other side of resistor 516 is connected to the first side of resistor 517 via a capacitor 518. The second side of resistor 516 is also connected to a capacitor 519, whose other side is connected to electrical ground and pin 8 of stage 512, to the inhibit input (pin 5) of stage 512, and to the first side of a resistor 520, whose other side is connected to pin 11 of stage 512. A capacitor 521 is connected between pins 6 and 7 of stage 512 and together with resistors 517, 516 and 520 and capacitors 518 and 519 set the frequency range and the response of the phase lock loop.

The other side of resistor 517 is connected to the respective outputs of the zero phase discriminator contained within stage 512, the 120 degree phase discriminator within dashed-line box 522 and the 60 degree phase discriminator contained within dashed-line box 524. Turning first to the zero degree phase discriminator, stage 512 contains a phase comparator having inputs at pins 3 and 14 and an output at pin 13. The zero degree position signal is provided to pin 14 via a line 523 effectively from the zero degree Hall device contained within dashed-line box 525. The zero degree timing signal is provided to pin 3 of stage 512 via a line 526 from the Q output of stage 527 of a divide-by-eighteen counter, whose purpose and operation is discussed in detail below with respect to the low rotation mode of the motor. The output signal indicative of the phase difference between the zero degree timing signal and the zero degree position signal is provided by pin 13 of stage 512 on a line 528 to resistor 517. It should be noted that the phase discriminator contained within stage 512 provides an error signal indicative of the phase difference between the leading edges of the zero degree timing signal and the zero degree position signal. Obviously, there are many other suitable forms for the zero degree phase discriminator other than the one contained within stage 512.

The 120 degree phase discriminator is contained within dashed-line box 522 and comprises a D flip-flop 529. The reset (R) input of flip-flop 529 is connected to electrical ground as is its data (D) input. The clock (CL) input is connected to the 120 degree timing signal from $\overline{Q}$3 of the timing signal source. The set (S) input is effectively connected to the output of the 120 degree Hall probe contained within dashed-line box 530. The signal on the Q output of flip-flop 529 is indicative of the difference between the leading edges of the 120 degree timing signal and the 120 degree position signal. This error signal is indicated by the amount of time that the Q output goes to the low stage, that is to say, the Q output is normally in the high state. The cathode of a diode 531 is connected to the Q output, and its anode is connected to line 528 and to one side of resistor 517.

The 60 degree phase comparator is contained within dashed-line box 524, and includes a D-type flip-flop 532. The reset (R) and data (D) inputs are connected to electrical ground. The clock (CL) input is connected to the output of the timing signal error correction circuit 507 by line 506, and this signal corresponds to the inverse of the 60 degree timing signal absent any error components. The set (S) input is effectively connected to the inverted output of the 240 degree Hall device contained within dashed-line box 533. The signal on the Q output of flip-flop 532 is normally in the high state, and goes to the low state in accordance with the phase difference between the leading edges of the 60 degree timing signal and the 60 degree position signal. The cathode of a diode 534 is connected to the Q output, and its anode is connected to line 528 and to resistor 517.

Thus, the error signals made up of the outputs from the zero degree, 120 degree and 60 degree phase discriminators cause the charge level on capacitor 518 to decrease in accordance with the amount of the error signal so as to cause the phase lock loop to perform the desired phase correction.

It is apparent to those skilled in the art that the phase comparators can take other forms than the D flip-flops shown within dashed-line boxes 522 and 524. Thus, the present invention is not limited to these types of phase comparators.

The zero degree position signal is provided by the Hall device contained within dashed-line box 525, which is provided with a suitable excitation voltage via a resistor 535. The outputs from the Hall device, which effectively is connected in a bridge circuit arrangement, is supplied by lines 536 and 537. Because lines 536 and 537 typically have long lengths, for example, thirty feet, and because the voltage level of the AC position signal on the DC offset voltage is quite low, high frequency transients of detrimental levels are picked up by these long lines.

In order to eliminate these high frequency transients, a low-pass filter is connected to each of these lines. Specifically, with respect to line 536, the low-pass filter consists of an inductor 538 connected in series, and a capacitor 539 connected to ground. Likewise, the low-pass filter for line 537 consists of an inductor 540 connected in series and a capacitor 541 connected to ground. Inductor 538 is connected via a resistor 542 in series connection to the non-inverting of a comparator 543. Comparator 543 is of conventional design. The inverting input of comparator 543 is connected via a series resistor 544 to inductor 540. Positive feedback paths are connected between the inverting and non-inverting inputs and the output 545 of comparator 543 so as not to introduce any offset in the DC voltage present in the input caused by the offset of the Hall device.

Figure 4:
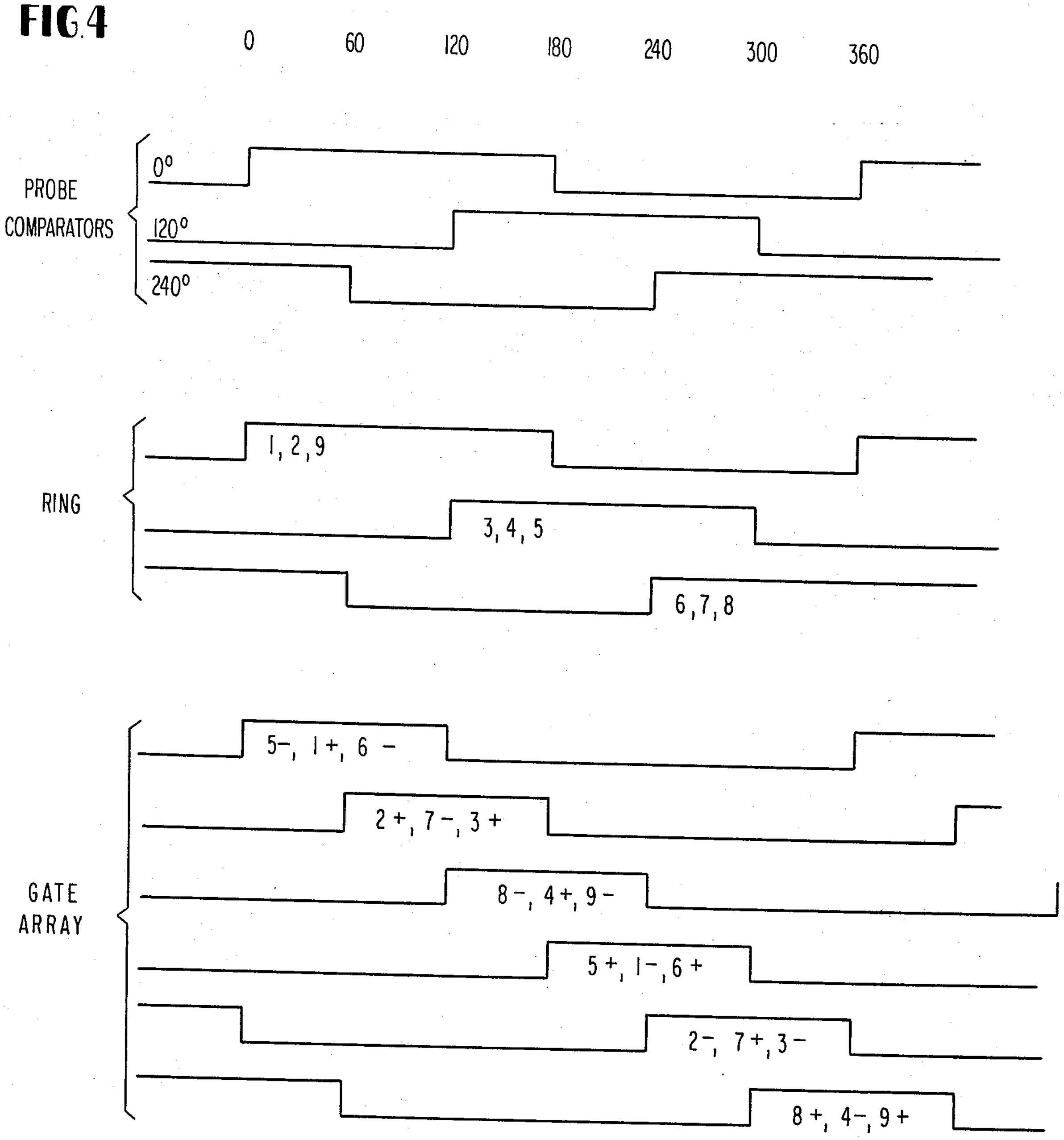
FIG. 4 plots the outputs of the position probe comparators, the timing signals, and the gating signals, with amplitude plotted on the vertical axis of each trace and with electrical degrees plotted on the horizontal axis of each trace, when the system of the present invention is operated in the direct set or low rotation mode.

Specifically, a positive feedback path is provided between the inverting input and the output 545 by resistors 546 and 547. Similarly, a positive feedback path is provided between the non-inverting input and the output 545 by an inverter 548 and resistors 549 and 550. Resistors 551 and 552 are respectively connected to electrical grounds so as to complete the circuit. Thus, the output on line 545 from comparator 543 goes to the high state when the rotor passes the preselected zero degree stator position and remains in the high state until the rotor advances to the 180 degree preselected stator position, as is shown by the zero degree probe comparator traces of FIGS. 3 and 4. As stated above, the output of comparator 548 is provided to line 523 of the zero degree phase comparator.

The purpose of the positive feedback is to provide a hysteresis so that once comparator 543 changes state, it will not reverse until a significant change of signal level occurs. This improves the ability of the comparator 543 to reject transient noise.

The circuit of the 120 degree position signal generator contained within dashed-line box 553, and the circuit of the 60 degree position signal generator contained within dashed-line box 554 are each essentially the same as the circuit used for the zero degree position signal generator 555. For this reason, the circuit within dashed-line boxes 553 and 554 is not discussed in detail herein.

An additional feedback loop not shown in FIG. 2 but which should be discussed at this time is shown in FIG. 5. Specifically, this feedback loop generates a shift signal in accordance with the phase differences between, respectively, the leading edges of the 120 degree timing signal and the 120 degree position signal, and the leading edges of the 60 degree timing signal and the 60 degree position signal. Specifically, the $\overline{Q}$ output from the 120 degree phase comparator 522 is supplied via a diode 557 connected in the conduction direction to an RC circuit consisting of a resistor 558, and a capacitor 559 connected to ground. The $\overline{Q}$ output of flip-flop 529 is normally in the low state, but goes to the high state in accordance with the phase difference between the leading edges of the 120 degree timing signal and the 120 degree position signal. Similarly, the $\overline{Q}$ output of flip-flop 532 of the 60 degree phase discriminator 522 is normally in the low state, but goes in the high state in accordance with the phase difference between the leading edges of the 60 degree timing signal and the 60 degree position signal. The signal from the Q output of flip-flop 532 is supplied via a diode 560 connected in the conduction direction to resistor 558.

The error signals from the $\overline{Q}$ outputs of flip-flops 529 and 532 cause the charge on capacitor 559 to increase in proportion to the phase difference between the respective 120 degree and 60 degree signals. That is to say, the greater the phase difference of each of these two signals, the greater the charge on capacitor 559.

Capacitor 559 is also connected to one side of a resistor 561, whose other side is connected to a resistor 562. The other side of resistor 562 is connected to electrical ground. The node between resistor 561 and 562 is provided via a resistor 563 to the emitter of a transistor 564. The base of transistor 564 is connected to the output of an OP AMP 565, whose inverting input is connected to the other side of resistor 563. The emitter of transistor 564 is also connected to electrical ground via resistor 566. The collector of transistor 564 is connected to the base of transistor 567, whose emitter is connected via a resistor 568 to a voltage source, and is also effectively connected in a feedback loop to its base via a diode 569 and a resistor 570.

The signal on the collector of transistor 567 has a current level corresponding to the level of the voltage on capacitor 559. Thus, in other words, the amplifier formed by operational amplifier 565 and transistors 564 and 567 provide an amplified version of the phase error signal present on capacitor 559. This shift signal from the collector of transistor 567 is provided to the VCO input (pin 9) of stage 512 so as to control the frequency output of the voltage controlled oscillator.

Up to this point, the basic version of the phase lock loop commutation position control and method of the present invention has been described in detail. Other aspects of the present invention exist and will be discussed in detail below.

A problem with the phase lock loop shown in FIGS. 2 and 5 is that it does not work effectively at very low rotor rotations and certainly does not work when the rotor is as standstill. The solution to the phase lock loop problem is to use direct position sensing of the rotor at low rotations where commutation by the AC power from the AC power source on lines 10 to the converter 50 (FIG. 1) is always possible, and to transfer to the phase lock loop mode of operation when the frequency of the output converter 50 is less than or equal to one-half the frequency of the AC voltage source. In the case where the AC power source has a frequency of 400 Hz, the transfer to the phase lock loop mode of operation typically is made to occur when the electric power provided on line 52 is approximately 50 to 70 Hz, which is a rotor rotation of about 500 rpm when a seven-pole pair machine is being employed.

This solution, however, leaves the problem of what to do about the in between phases at the low rotations. The solution to this problem is to switch the thyristors as though the machine had only three phases, as opposed to nine phases, in the low rotation mode. As plotted in FIG. 4, this solution is achieved by making the positive conductor period of phase 1 and the negative conduction periods of phases 5 and 6 coincide. Phases 2 and 3 positive are made to coincide with phase 7 negative, phase 4 positive and phases 8 and 9 negative are made to coincide.

Because the drive current to any stator winding of the motor is no more than 20 electrical degrees away from the optimum point using this direct set mode of operation, and because torque produced by the motor is proportional to the cosine of the angle between the generated voltage (EMF) and the applied current, the maximum 20 electrical degree position error gives cosine 20 degree or 0.94 relative torque. Because at any one time the maximum position error reduces the torque to 0.94 on two of the three phases with the torque on the other phase being normal, the relative torque produced by the motor in this worst case mode would be 0.96 of optimum. The position error does not hinder commutation at low rotations where commutation is produced by the supply voltage and not by the machine voltage. In the low rotation mode, which is also designated as the direct mode, periods of conduction of the thyristors in converter 50 may be chosen independent of the machine back EMF because the thyristors are switched by the AC voltage source. The timing signals are generated in accordance with the position of the rotor as sensed by the zero position sensor, the 120 degree position sensor, and the 240 degree sensor.

FIG. 8 illustrates in block diagram form the configuration of the present invention when operating in the direct set mode. In this low speed or direct set mode, the position sensors, designated by reference numeral 802, through their respective comparators, designated by reference numeral 804, directly set the ring stages of the nine-stage ring counter, designated by reference numeral 806. Thus, the timing signals provided by the nine-stage ring counter 806 to the gate array, designated generally by reference numeral 808, are reduced from nine to three. Thus, the system is operating the motor in basically a quasi-three phase mode instead of the normal nine-phase mode. Similarly, as shown by the traces in FIG. 4, there are only different six gating signals provided by gate array 808, as compared with the normal eighteen different gating pulses provided when the system is being operated in the normal nine-phase mode. At the selected rotation level, for example, 500 rpm, the direct sets are disabled and the phase lock loop operates as described above.

A pre-sync loop, contained within dashed-line box 810, controls the VCO 814 frequency during the low rotation mode to minimize transients at the transfer to the phase lock loop mode. The pre-sync phase lock loop consists of a phase discriminator 812 receiving the output from one of the comparators 804. The phase error signal from phase discriminator 812 is applied to the voltage controlled oscillator 814, which provides a clocking signal on a line 816 to a divide-by-eighteen counter, designated by reference numeral 818. Divide-by-eighteen counter 818 provides a square wave output, whose frequency is one-eighteenth the clock frequency. The pre-sync phase lock loop causes the frequency of the voltage controlled oscillator to track substantially the rotation of the machine so that when the system changes from the direct set mode to the normal phase lock loop mode, no substantial transient occurs.

A mechanization of the direct set mode aspect of the present invention shown in block diagram form in FIG. 8 is shown in FIG. 5 and is now described in detail. As stated above, each of the CD4018A counters which make up the nine-stage ring counter includes jam inputs (J1–J5), which allow their respective outputs to be set at a desired level when the present enable signal is also present on the P input. The zero degree position signal on line 545 is applied via lines 575, 576 and 577 to jam inputs J3, J2, J1, respectively, of the lower counter of the nine-stage ring. Thus, when the zero degree position signal is in the high state and a present enable signal on line 513 is also in the high state, the 20 degree, zero degree, and 160 degree timing signals provided by outputs $\overline{\mathbf{C3}}$, $\overline{\mathbf{B2}}$, $\overline{\mathbf{A1}}$, respectively, are each in the low state.

Similarly, the 60 degree position signal is supplied to jam outputs J5 and J4 of the lower counter and the jam input J1 of the upper counter and are received by these counters when the preset enable signal on line 513 is in the high state. When the 60 degree position signal is in the high state and a preset enable signal on line 513 is also in the high state, the timing signals on outputs $\overline{\mathbf{D4}}$, $\overline{\mathbf{E5}}$ and $\overline{\mathbf{Q1}}$, corresponding to the 40 degree, 60 degree and 80 degree timing signals, respectively, are in the low state.

Finally, the 120 degree position signal is furnished to jam inputs J2, J3 and J4 of the upper counter of the nine-stage ring and are received thereby when the preset enable signal on line 513 is in the high state. When the 120 degree position signal is in the high state and a preset enable signal on line 513 is also in the high state, the timing in signals corresponding to the 100 degree, 120 degree and 140 degree timing signals supplied by outputs $\overline{\mathbf{Q2}}$, $\overline{\mathbf{Q3}}$, and $\overline{\mathbf{Q4}}$ go to the low state. Thus, it is seen that the direct set mode using the jam inputs on the CD4018A counters can cause the ring counter to go to a three-phase mode of operation when the preset enable signal on line 513 is in the high state.

The preset enable signal is provided by the preset enable signal circuit contained within dashed-line box 514. A pulse train whose frequency is a function of the rotation of the rotor is provided by a speed circuit (FIG. 12 discussed below) to the anode of a diode 580. The cathode of diode 580 is connected to a RC circuit made up of a resistor 581 in series connection and a capacitor 582 connected between the resistor and electrical ground. The side of capacitor 582 not connected to electrical ground is connected to the inverting input of a comparator 583. The non-inverting input of comparator 583 is connected to a voltage divider network made up of resistors 584, 585, 586 and 587. One side of resistor 587 is connected to electrical ground. The node between resistor 586 and resistor 585 is connected to a positive voltage source, for example, 12 volts. The node between resistor 585 and resistor 584 is connected to line 513. The non-inverting input of comparator 583 is connected to the node between resistor 584 and resistor 587. The preset enable circuit is configured so that the signal on line 513 is in the high state until the rotation of the rotor exceeds a preselected level, which typically is less than or equal to a level proportional to one-half of the frequency of the source of AC electric power applied via lines 10 to converter 50 (FIG. 1). Obviously, other suitable configurations for providing the preset enable signal during this condition can be utilized and are within the scope of the present invention.

The pre-sync phase lock loop 810 is made up of a divide-by-nine counter stage 590. A suitable form by divide-by-nine counter 590 is a CD4018A CMOS presettable divide-by-N counter. The jam inputs J1 to J5 along with the reset (R) input and the preset enable (P) input are connected to electrical ground. The clock (CL) input is connected at line 511 to the clocking signal from the variable frequency oscillator 512. As is well known, counter 590 can be configured to be a divide-by-nine counter by connecting the $\overline{Q4}$ and $\overline{Q5}$ outputs via a NOR gate 592 and an inverter 593 to the data (D) input thereof. The data input 590 is also connected to the clock (CL) input of a D flip-flop 527. The data input is connected to the $\overline{Q}$ output of flip-flop 527. The reset (R) input is connected to the output of a NOR gate 594, whose inputs are connected to the zero degree timing signal from $\overline{B2}$, and also to the preset enable signal on line 513. The set (S) input is connected to the output of a NOR gate 595 having an input connected to the output of NOR gate 594 and an input connected to the preset enable line 513. The Q output from flip-flop 527 is connected to the zero degree phase comparator within stage 512, and is high for nine clocking signal pulses and is low for nine clocking signal pulses, thereby effectively dividing the clocking signal frequency by eighteen. Thus, the pre-sync circuit made up of counter 590, flip-flop 527 and the zero degree phase discriminator within stage 512 cause the frequency of the voltage controlled oscillator 512 to track effectively the rotation rate of the rotor during the direct set mode so that when the system transfers to the phase lock loop mode, no transient system responses occur.

Figure 9:
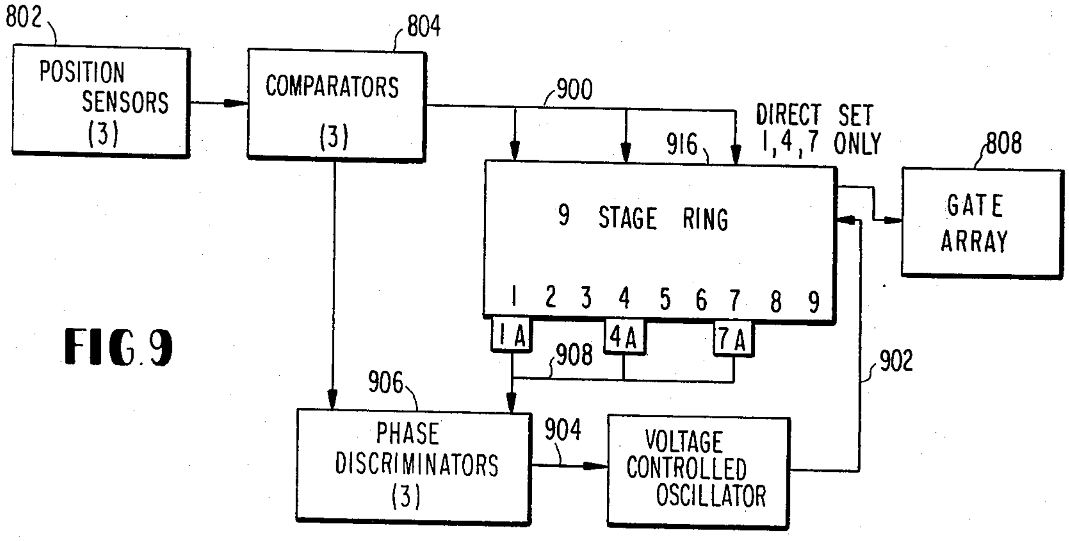
FIG. 9 is a block diagram of another embodiment of the present invention for operating the system in the direct set or low speed mode.

An alternate embodiment for operating the phase lock loop commutation position control and method of the present invention in the direct set or low rotation mode is shown in block diagram form in FIG. 9. Like reference numerals FIGS. 8 and 9 refer to corresponding stages; only the different stages shown in FIG. 9 are discussed in detail.

The nine-stage ring counter 916 is made up of a nine-stage ring consisting of stages (1), (2), (3), (4), (5), (6), (7), (8) and (9). In addition, counter 916 includes additional stages (1A), (4A) and (7A). The data input of stage (1A) is the same as that of stage (1), the data input of stage (4A) is the same as that of stage (4), and the data input of stage (7A) is the same as that of stage (7). The outputs of stages (1), (4) and (7) can be set directly by signals at their respective jam inputs when a preset enable signal is present at the P input. In the normal mode, when the preset enable signal is not present, the outputs of stages (1) and (1A) are identical, the outputs of stages (4) and (4A) are identical, and the outputs of stages (7) and (7A) are identical. However, when the preset enable signal is present, the outputs of stages (1), (4) and (7) are set by the signals at their respective jam inputs 900, whereas the outputs of stages (1A), (4A) and (7A) are controlled by the clocking signal. This configuration of counter 916 allows a gradual transition from the three-phase mode to the nine-phase mode to be achieved as the rotation of the motor increases to the nine-phase mode level.

The zero degree position is supplied to the jam input for stage (1), the 60 degree position signal is supplied to the jam input for stage (4), and the 120 degree position signal is supplied to the jam input for stage (7). The timing signals provided to gate array 808 are supplied by stages (1) to (9). The clocking signal is supplied via a line 902 to the clock input of counter 916 and is generated by the voltage controlled oscillator 814 in accordance with an error signal supplied on a line 904 by summing the outputs of the three discriminator stages contained within a stage 906.

The three discriminators generate the error signal in a fashion similar to the method used to generate the error signal of the basic embodiment of the present invention described with reference to FIG. 2. The error signal is the sum of the phase difference between the leading edge of the zero degree timing signal and the leading edge of the zero degree position signal, the leading edge of the 60 degree timing signal and the leading edge of the 60 degree position signal, and the leading edge of the 120 degree timing signal and the 120 degree position signal, respectively. It should be noted that the three timing signals, which are used to generate the error signal, are furnished via lines 908 which are connected between the three phase discriminators of stage 906 and the respective outputs (1A), (4A) and (7A) of ring counter 916.

When the system is in the direct set mode, stages (2), (3) and (4A), for example, lag the output of directly set stage (1) by one, two and three clock periods, respectively. If the clock frequency is held constant, the phase shift to stages (2), (3) and (4A) increases in direct proportion to the rotation of the motor so that the outputs of stages (2), (3) and (4A) gradually shift from being in phase with stage (1) towards the nine-phase condition. This explanation applies to the other stages in this embodiment.

Since the phase discriminator inputs 908 to phase discriminators 906 come from stages (1A), (4A) and (7A), as the outputs of these stages shift back to positions mean those of stages (1), (4) and (7), respectively, the phase discriminator outputs adjust the voltage controlled oscillator 814 so that the phase lock loop becomes locked. Now, the system is in the nine-phase mode even though the position signals are still directly setting the outputs of stages (1), (4) and (7). Thus, the direct sets of stages (1), (4) and (7) can be removed when the system is transferred to the phase lock loop mode without any transients in system performance occurring. The only reason no longer to set directly stages (1), (4) and (7) is to allow controlled phase advance of ring 916, as is discussed in detail below.

Figure 10:
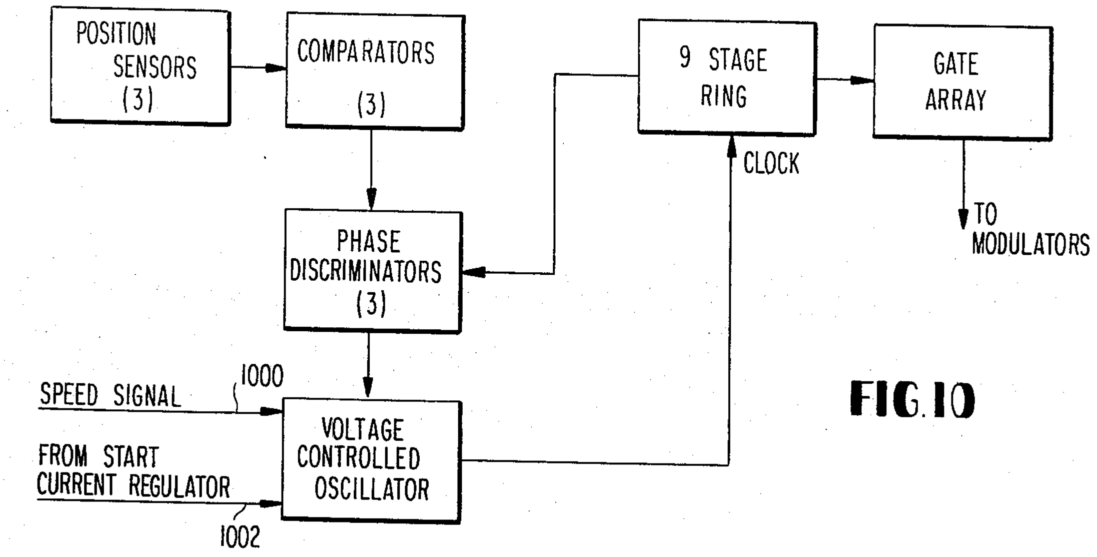
FIG. 10 shows in block diagram form the functional elements of the present invention when it is operated in the normal phase lock loop mode.

FIG. 10 shows in block diagram form the basic embodiment of the present invention as described above with reference to FIGS. 2 and 5, and also shows the addition of a rotation signal on a line 1000 and a start current regulator signal on a line 1002 furnished to the voltage controlled oscillator so that desired phase advance between the timing signals and the corresponding position signals is produced by the nine-stage ring counter. This ability to phase shift over a substantial conduction angle of the embodiment of the present invention shown with reference to FIG. 10 is essential in order for the system and method of the present invention to cause optimum torque, commutation and field weakening to be produced.

Figure 11:
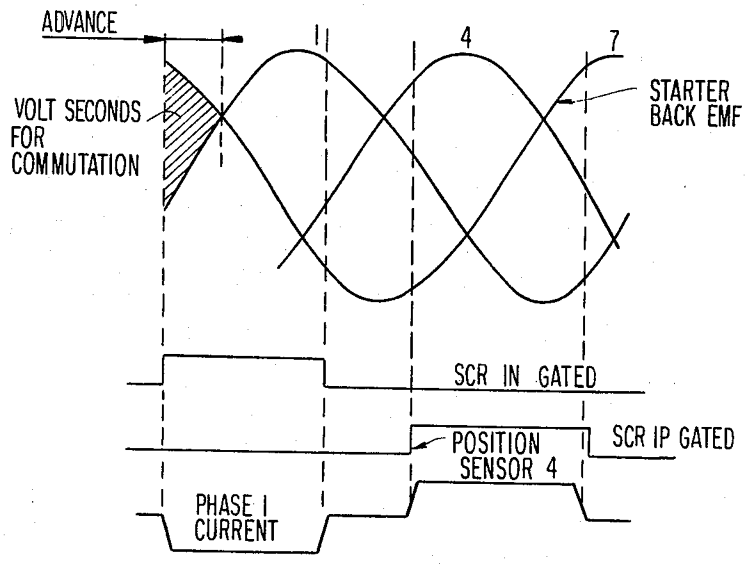
FIG. 11 plots amplitude on the vertical axis with respect to time on the horizontal axis of a machine back EMF voltage and phase-advance gating signals provided to the converter.

In order for the machine to generate optimum torque, the current supplied to the stator windings should be 180 degrees out of phase with the machine generated (EMF) voltage. This phase relationship is possible only at low rotations where the commutation is produced by the supply electric power. At higher rotations, the current must be switched earlier, as is shown in FIG. 11. The desired phase advance is indicated on FIG. 11. The shaded volt-second area shown on FIG. 11 must transfer the current from phase 7 to phase 1 before phase 1 back EMF voltage exceeds phase 7 back EMF voltage.

Another aspect of the present invention employs phase advance over a substantial angle so as to obtain optimum torque and commutation by controlling the phase advance in accordance with the rotation of the motor. A phase shift signal as a function of the rotation is furnished in varying degrees to the voltage controlled oscillator to produce increasing phase advance with rotation. This phase advance is typically started at a rotation corresponding to one-half the frequency of the supply power source. In a 400 Hz system, for example, the phase advance as a function of rotation is started at approximately a machine frequency of 200 Hz.

Figures 12, 13:
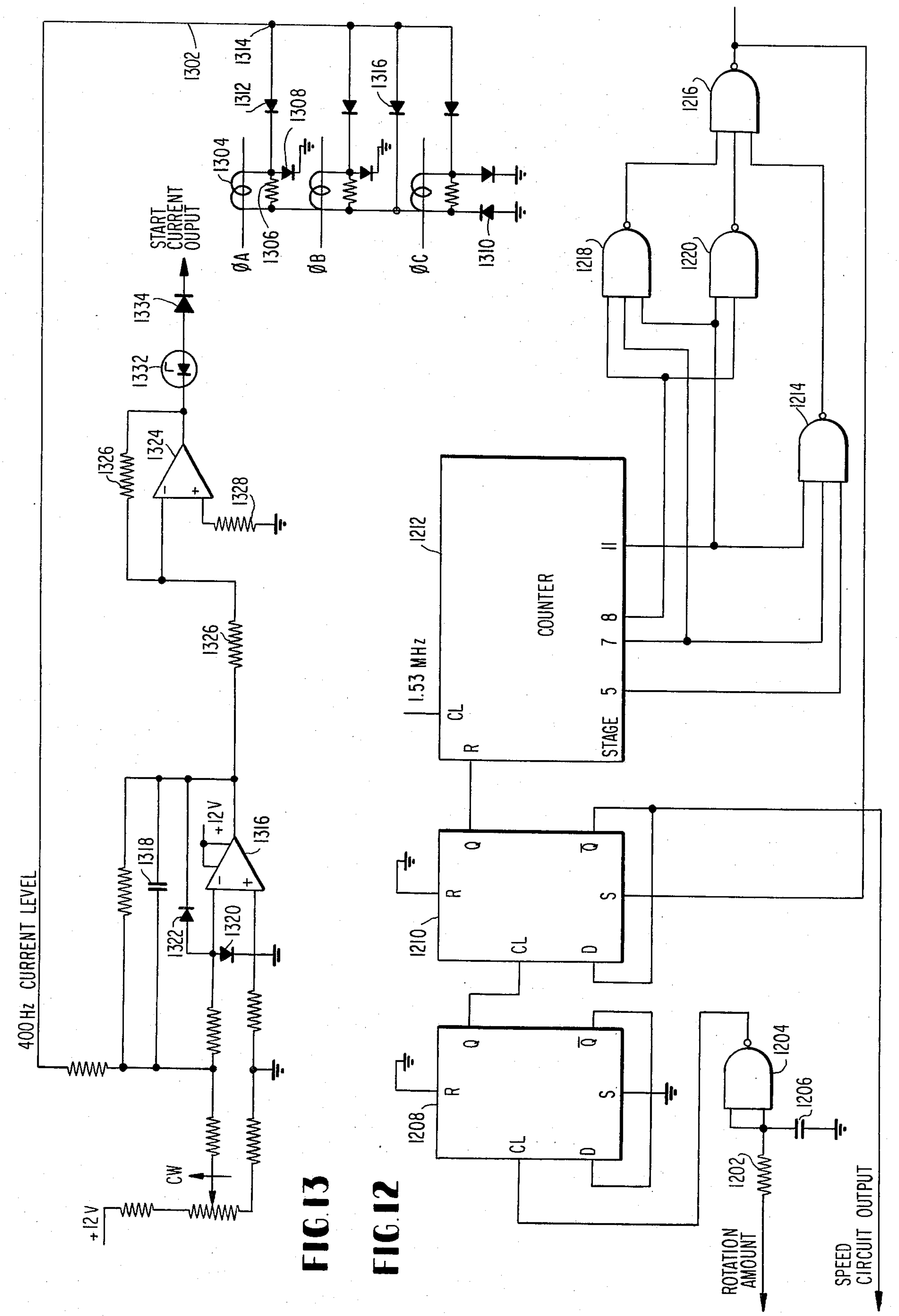
FIG. 12 is a circuit block diagram of the circuit used to generate the speed output signal of the aspect of the present invention where the timing signals are advanced with respect to the position signals in accordance with the rotation level of the motor.
FIG. 13 is a circuit block diagram of the circuit used to generate the start current regulator output signal used in the aspect of the present invention where the timing signals are advanced with respect to the position signals as a function of the current level of the electric power of the converter.

A mechanization of the circuit for generating the phase shift signal as a function of the rotation of the rotor and for adding the phase shift signal to the error signal effectively to cause a preselected timing signal to be advanced with respect to a corresponding position signal is shown in FIGS. 5 and 12.

Referring first to FIG. 5, a buffer 1200 has an input connected to the zero degree position signal at the output of inverter 548. The output of buffer 1200 is a rotation amount signal, which essentially is a square wave serial pulse train having a frequency corresponding to the machine frequency. This rotation amount signal is effectively applied to the clock (CL) input of a D flip-flop 1208 by a NAND gate 1204. The reset (R) and set (S) inputs of flip-flop 1208 are connected to electrical ground. The data (D) input is connected to the $\overline{Q}$ output. The Q output is connected to the clock (CL) input of a flip-flop 1210. Flip-flop 1208 is thus configured to act as a divide-by-two counter.

The reset (R) input of flip-flop 1210 is connected to electrical ground. The Q output is connected to the reset (R) input. The clock (CL) input of counter 1212 is connected to a clocking signal source, which provides a clocking signal of preselected frequency. The clocking signal frequency is selected so that the counter provides the desired output count signals. A representative frequency value is 1.53 Mhz.

Suitable counter stage outputs from counter 1212 are provided to a plurality of logic stages, which collectively generate a set signal when the counter reaches a desired count level. For example, the fifth, seventh and eleventh stages of counter 1212 are provided as inputs to a NAND gate 1214, whose output is provided as an input to a NAND gate 1216. The seventh, eighth and eleventh inputs are provided as inputs to a NAND gate 1218, whose output is provided as an input to NAND gate 1216. Finally, the eighth and eleventh stage outputs from counter 1212 are provided as inputs to a NAND gate 1220, whose output is provided as the third input to NAND gate 1216. The set signal at the output of NAND gate 1216, which is present when the counter reaches the desired count level, is provided to the set (S) input of flip-flop 1210. The data (D) and $\overline{Q}$ outputs of flip-flop 1210 are connected together and provide the speed circuit output signal or rotation signal to the anode of diode 580 of FIG. 5. Flip-flop 1210 normally acts as a divide-by-two counter, but can be set if an output signal is provided by NAND gate 1216. Thus, the speed circuit output signal is proportional to the frequency of rotation.

Referring now to FIG. 5, the speed circuit output signal is applied to a diode 580. Suitable scaling of the speed circuit output signal at the cathode of diode 580 is produced by resistor 581 and a resistor 1220, before applying the speed circuit output signal to the inverting input of an operational amplifier 1222. A supply voltage of preselected amplitude and polarity (for example, minus 12 volts) is suitably scaled via a resistor 1224 and is also applied to the inverting input of operational amplifier 1222. The non-inverting input of operational amplifier 1222 is connected via a resistor 1226 to electrical ground. The output of operational amplifier 1222 is proportional to the difference between the scaled speed circuit output signal and the scaled reference voltage signal at the inverting input.

The output from operational amplifier 1222 is applied via a scaling resistor to the inverting input of operational amplifier 565, and effectively is used to generate the current error signal at the collector of transistor 567, which is applied to the input of the voltage controlled oscillator 512 to affect the desired phase advance. Because the circuitry used to generate the current error signal at the collector of transistor 567 was discussed in detail above, it is sufficient to state here only that the output signal from operational amplifier 1222 is used as an additional signal to modulate this current error signal so as to produce the desired phase advance.

It should be understood that other embodiments for producing the desired phase advance with respect to the rotation level of the motor is contemplated by the control and method of the present invention, and the mechanization shown in FIGS. 5 and 12 is only representative of one possible approach for producing this desired phase advance.

As the rotation of the machine increases, the generated back EMF voltage increases accordingly and the gating of the thyristors must be phase advanced with respect to the input electrical supply to converter 50 (FIG. 1) to maintain the input current to the machine. At a certain rotation level, the machine back EMF voltage has increased to the point where the thyristors are phased full on with respect to the input electrical power to the convertor 50. The input current to the machine, and consequently the torque produced by the machine, then drop rapidly unless the machine back EMF voltage can be reduced.

This aspect of the present invention overcomes the deficiency caused by the machine back EMF when it approaches the voltage level of the electric power furnished by converter 50 to the machine. In this aspect of the present invention, the thyristors take over the function of field control. This is done by phase advancing the gating of the thyristors with respect to the rotor position so that the machine draws more reactive current, which reduces the effective field and the back EMF. More real power can then flow into the machine so that the torque is maintained. This desired field weakening is indirectly achieved by increasing the reactive component of the current by advancing the rotor position in the phase lock loop.

The start current regulator signal on line 1002 (see FIG. 10) is furnished when the current regulator amplifier voltage exceeds the peak of the firing wave at a preselected rotation level. The start current regulator signal is added to the error signal effectively to cause the preselected timing signal to be advanced with respect to the corresponding position signal. The addition of this shift signal produced as a function of the current level of the electric power causes the input current to the machine to be regulated by controlling the machine voltage indirectly via reactive current. For example, typical breakover point for a VSCF starter/generator occurs at 6000 rpm or 700 Hz. Obviously, the breakover point will occur at a rotation dependent on the machine back EMF voltage and the AC power supply voltage.

A mechanization of this aspect of the present invention is shown in FIGS. 5 and 13. Referring now to FIG. 13, a composite signal representative of the current level of the electric power being furnished to the machine is present on a line 1302. This current signal can be generated in any suitable fashion. One approach is to sense the current level of each of the input phases to converter 50 (FIG. 1) and to derive the composite current signal by adding rectified versions of the current level signals for each of the respective phases.

Specifically, as shown in FIG. 13, a current transformer 1304 is connected to sense the current level in phase A of the input power to converter 50. A resistor 1306 is connected between the secondary windings of current transformer 1304. One side of the secondary winding is connected to the anode of a diode 1308, whose cathode is connected to electrical ground. The other side of the secondary winding of current transformer 1304 is connected to the cathode of a diode 1310, whose cathode is connected to electrical ground. The anode of diode 1308 is connected to the cathode of a diode 1312, whose cathode is connected to a node 1314 at which the composite current level signal is present. The circuitry used to produce analogous signals corresponding to the current levels of phase B and phase C of the input electrical power to converter 50 (FIG. 1) are shown in FIG. 13, but are not described in detail because they are identical. It should be noted, however, that the cathode of a diode 1316 is connected to one side of each of the secondary windings of the respective current transformers, and its anode is also connected to node 1314.

The current level signal at node 1314 is provided via line 1302 via suitable scaling resistors to the input of an operational amplifier 1316. Operational amplifier 1316 is connected in an integrator configuration to provide an output signal which corresponds to the integral of the difference between current level signal on line 1302 and a selected reference signal.

The output from operational amplifier 1316 is provided via a suitable scaling resistor to the input of an inverting amplifier 1324, whose output is an inverted version of the output signal from operational amplifier 1316.

When the output of operational amplifier 1324 exceeds a preselected voltage level, which corresponds to a preselected current level of the electric power from converter 50 (FIG. 1), a start current regulator signal is provided on a line 1330. The preselected current level corresponds to the current level at which the regulator (operational amplifier 1316) can no longer cause current to increase by phase controlling the thyristors with respect to the incoming AC power to converter 50. This function of providing the start current regulator signal only after it has attained a preselected voltage value is achieved by using a Zener diode 1332. The breakdown voltage of the Zener diode 1332 is the voltage at which the start current regulator signal is provided by the circuit shown in FIG. 13.

The start current regulator signal on line 1330 is provided via a scaling resistor 1336, as shown in FIG. 5, and via a RC circuit made up of a capacitor 1338 and a resistor 1340 to the non-inverting input of operational amplifier 565. The output of operational amplifier 565, as discussed with respect to the basic embodiment of the present invention discussed above, is provided to the base of transistor 564. Thus, a signal which is a function of the start current regulator signal is used to modulate the current error signal provided at the collector of transistor 567. As stated above, this current error signal is provided to the input of the voltage controlled oscillator 512 so as to produce the desired phase advanced of the timing signals with respect to the corresponding position signals. Thus, in the embodiment of this aspect of the present invention shown in FIGS. 13 and 5, the current level of the electric power is used to produce a shift signal which is added to the error signal effectively to cause the preselected timing signals to be advanced with the corresponding position signals so that desired field weakening in the motor can be produced. This field weakening allows more current to be provided to the motor so that the torque produced by the motor can be maintained.

It should be understood that the embodiment of this aspect of the control and method of the present invention is only illustrative and other embodiments for producing the phase advance with respect to the current level of the electric power signal so as to maintain the torque produced by the motor at high rotation levels are contemplated.

Figure 14:
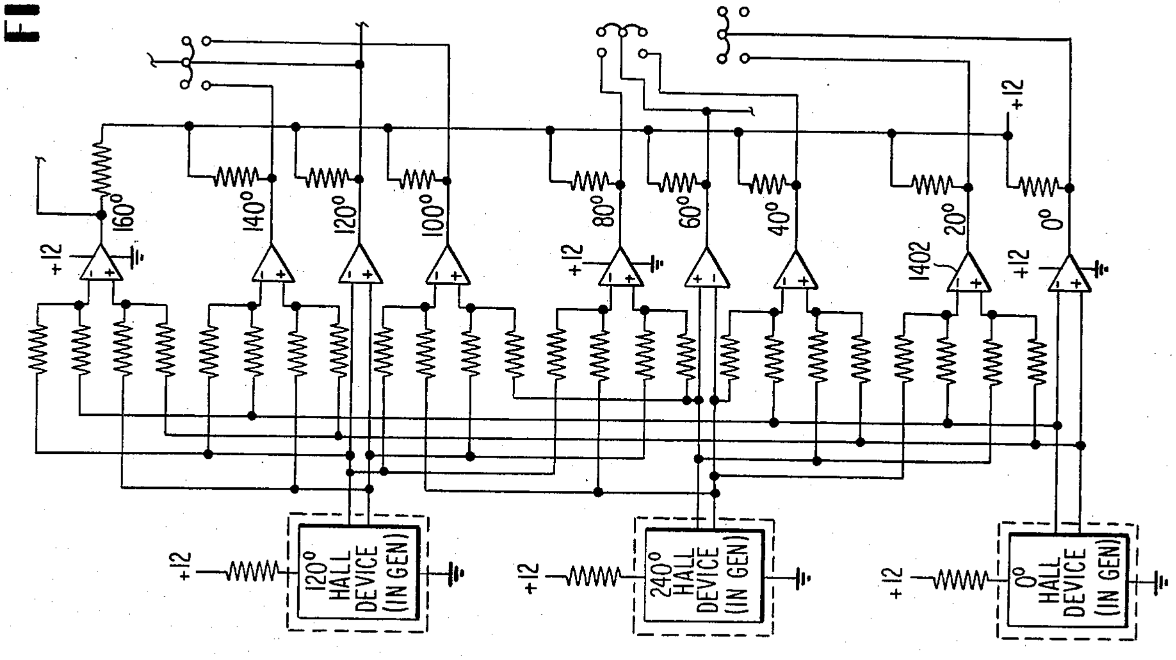
FIG. 14 is a circuit block diagram of an aspect of the present invention where the intermediate position signals are generated by vector addition of the output signals from the position sensors.

FIG. 14 shows an alternate embodiment for generating the intermediate position signals when a fewer number of position sensors are used than the number of phases in the motor. In the embodiment of FIG. 14, the intermediate positions are generated by using the outputs of the position probes as micropower three-phase generators and to develop the intermediate angles by phasor addition. When this micropower approach is used, however, the outputs of all of the probes must be made equal, which requires the gain of the probes to be matched or their excitation, in the case of Hall probes, to be individually adjusted.

Referring now to FIG. 14, the zero degree, 60 degree and 120 degree position signals are generated in a fashion similar to that used with respect to the approach shown in FIGS. 2 and 5. That is to say, the comparators provide signals which are indicative of these position signals. The remaining position signals are generated using phasor addition through the use of comparators and suitable scaling resistors. For example, the 20 degree position signal is generated by connecting the inverting input of a comparator 1402 to the output from the zero degree position sensor and the 240 degree position sensor, and the non-inverting input to the output of the zero degree position sensor and the 240 degree position sensor via suitable scaling resistors so as to produce the desired phasor addition. The other intermediate position signals are generated in similar fashion, and are not discussed in detail herein. These intermediate position signals can be used during the direct set mode to achieve nine-phase operation of the system.

Up to this point, the phase lock loop commutation position control and method of the present invention has been described for use with a drive system for a DC field motor having a rotor and a plurality of stator windings. The drive system has not been limited to any particular application.

The present invention, however, has particular applicability for use in a VSCF starter/generator, which has found particular applicability in the aircraft environment.

Figure 15:
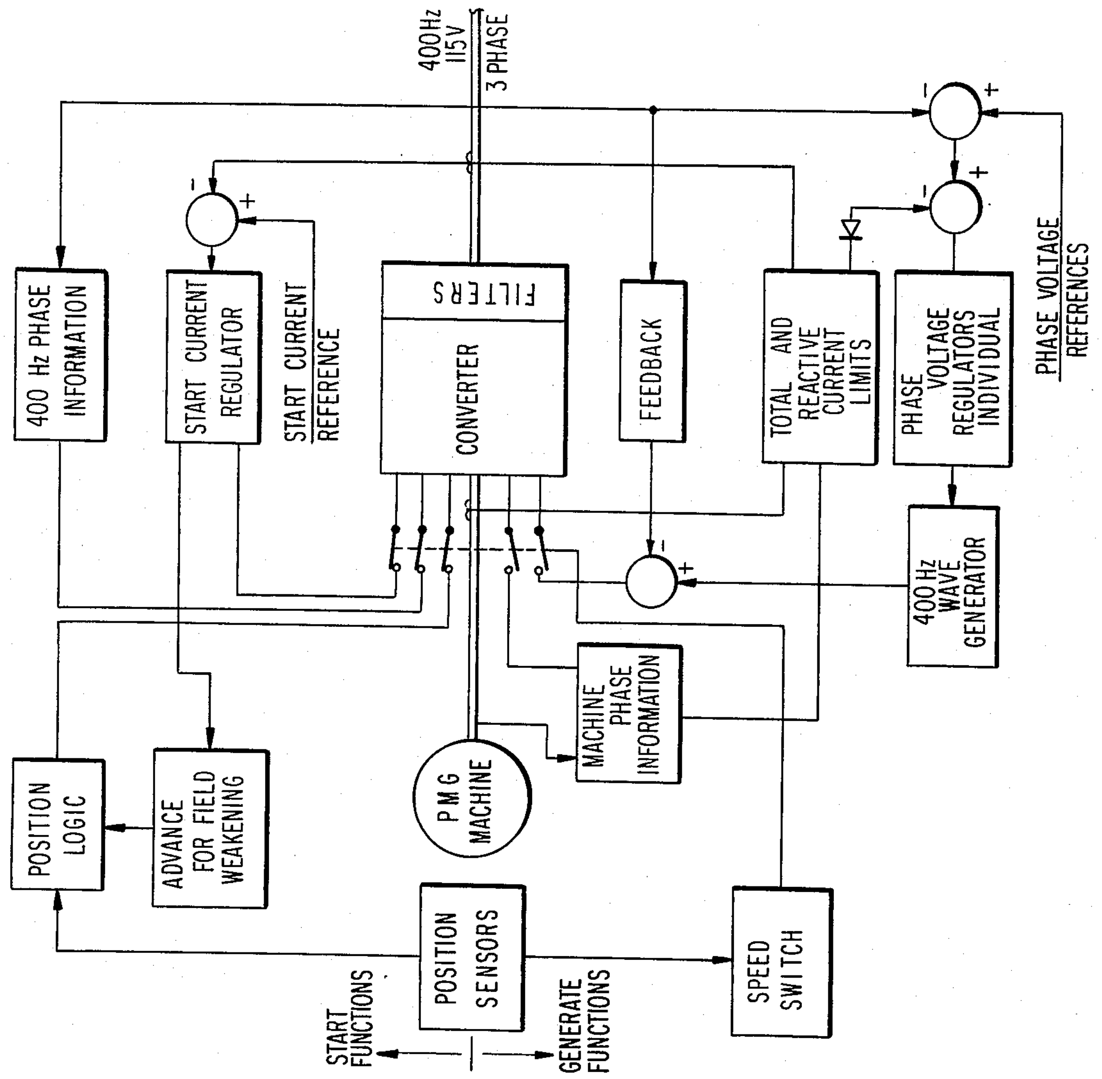
FIG. 15 is a block diagram of the present invention used in conjunction with a VSCF motor/generator system having particular applicability in the aircraft environment.

FIG. 15 shows a suitable VSCF starter/generator system used in an aircraft environment. The blocks on the upper half of FIG. 15 correspond to the functional elements of the various aspects of the present invention described above; the blocks on the lower half of FIG. 15 make up those stages of the VSCF generator system which also employs the same machine used as the motor in the start mode. The various VSCF references described above set forth the structure and function of such combination motor/generator system. Thus, the system shown in FIG. 15 now is described only in basic detail.

The permanent magnet generator (PMG) machine is connected to the rotor of a jet engine (not shown). The jet engine is driven up to idle speed by operating the system in the motor mode in the fashion described above with respect to the various aspects of the present invention. After the jet engine has reached idle speed, the system switches into the VSCF generator mode of operation.

The converter converts the variable voltage and frequency power output from the PMG machine, which is now operating as a generator, to a constant voltage and frequency power output. The converter can be of any form, but suitably is a cycloconverter.

At the center of FIG. 15 is the main power path of the machine, the converter-filter, and the 400 Hz terminals. Power flows from left to right in the generator mode. The cycloconverter functions as a linear amplifier, and reproduces 400 Hz sinusoidal reference waves from the wave generator at the power level required by the aircraft loads. The cycloconverters forms sinusoidal output waves by the phase controlled thyristors so that the average voltages at the rectifier banks are the desired sine waves. The output waves are programmed on both positive and negative thyristor banks throughout the cycle so that the load current can flow in either direction with either voltage polarity. The speed switch connected to the position sensors causes the system to switch between the motor mode and the generator mode at a preselected rotation level of the machine.

The machine can be of any suitable type. However, one suitable form for the machine is that utilizing rare earth (samarium cobalt) permanent magnet as the field excitation source. The rotor of such a machine can be made mechanically equivalent to a solid piece of metal and its losses result only from windage and surface eddy current. Rare earth magnets have major BH loops which are almost ideally reversible in the second quadrant. It should be understood, however, that the rotor of a suitable machine for use with the present invention can have windings thereon.

It should also be understood that the control and method of the present invention is not limited to the phases and pole pairs described above which were used only for purposes of illustration.

While there have been shown and described what are at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. A drive system for a multiphase DC field motor having a rotor and a stator windings for each machine phase, said drive system comprising:

(a) means for sequentially supplying electric power to said stator windings in response to gating signals generated in accordance with the position of the rotor with respect to such stator windings;
(b) means for generating gating signals for sequentially supplying electric power to said stator windings in accordance with a plurality of timing signals equal to the number of machine phases;
(c) means for generating said timing signals as a function of the position of said rotor comprising;
(d) means for furnishing a plurality of position signals as a function of the position of said rotor with respect to a plurality of preselected stator positions, said position signals being lesser in number than the number of stator windings;
(e) means for generating error signals proportional to phase difference between preselected ones of said timing signals and said positions signals;
(f) means for producing clocking signals as a function of said error signals;
(g) means for supplying said clocking signal to said means for generating timing signals;
(h) means for deriving additional timing signals representative of intermediate rotor positions from said clocking signals.

2. The drive system of claim 1, further comprising:

(a) means for producing a shift signal as a function of said rotation of said rotor; and
(b) means for adding said shift signal to said error signal effectively to cause said preselected timing signal to be advanced with respect to said position signal.

3. The drive system of claim 1, further comprising:

(a) means for providing a shift signal as a function of the current level of said electric power; and
(b) means for adding said shift signal to said error signal effectively to cause said preselected timing signal to be advanced with respect to said position signal.

4. The drive system of claim 1, further comprising direct mode means for causing said timing signals to be provided to said means for generating said gating signals in accordance with said position signal when said rotation of said rotor is below a preselected value.

5. The drive system of claim 4, further comprising counter means for providing to said means for generating an error signal a signal indicative of said preselected timing signal when said rotation of said rotor is below said preselected value.

6. The drive system of claim 1, further including direct mode means for causing a first timing signal to be provided to said means for generating said gating signal in accordance with said position signals and for causing at least a second timing signal to be provided to said means for generating said gating signals whereby said gating signals are a function of the phase difference between said second timing signal and said position signals when said rotation of said rotor is below a preselected value.

7. The drive system of claim 1, further comprising:
(a) means for generating a shift signal as a function of the phase difference between said preselected timing signal and said position signal; and
(b) means for adding said shift signal to said error signal effectively to cause said preselected timing signal to be advanced with respect to said position signal.

8. The drive system of claim 1, wherein said means for supplying electric power to said stator windings comprises:
(a) a source of multiphase electric power; and
(b) cycloconverter means connected to said source of multiphase electric power for selectively supplying electric power to said stator windings in accordance with said gating signals, said cycloconverter means including banks of oppositely poled conduction controlled rectifying devices.

9. The drive system of claim 1, wherein said means for generating said gating signals comprises logic means connected to said means for providing said timing signals for generating said gating signals for said means for supplying electric power in response to said timing signals.

10. The drive system of claim 1, wherein said means for providing said timing signals comprises register means for providing said timing signals to said means for generating said gating signals in response to said clocking signal.

11. The drive system of claim 1, wherein said means for providing said timing signals comprises ring counter means for providing said timing signals to said means for generating said gating signals in response to said clocking signal.

12. The drive system of claim 11, wherein said means for providing said timing signals further comprises means connected to said ring counter means for correcting erroneous timing signals.

13. The drive system of claim 1, wherein said means for furnishing a position signal comprises:
(a) means for generating a first signal in accordance with the pole flux of said DC field motor at said preselected stator position; and
(b) means for providing said position signal in response to said first signal.

14. The drive system of claim 13, wherein said means for generating a first signal includes a Hall probe, and wherein said means for providing said position signal includes a comparator having inputs effectively connected to said Hall probe and an output providing said position signal.

15. The drive system of claim 14, wherein said comparator is configured to cause said position signal to change abruptly in response to a phase reversal of said pole flux substantially at said preselected stator position.

16. The drive system of claim 13, wherein said means for generating a first signal includes a flux coil, and wherein said means for providing said position signal includes a comparator having inputs effectively connected to said flux coil and an output providing said position signal.

17. The drive system of claim 1, wherein said means for furnishing a position signal comprises:
(a) indicator means mounted on said rotor and having a sensible means at a fixed position thereon; and
(b) means for sensing said sensible means and for providing said position signal in accordance with said sensing of said sensible means.

18. The drive system of claim 1, wherein said means for generating an error signal comprises logic means having inputs effectively connected to said preselected timing signal and said position signal, respectively, and an output providing said error signal proportional to the phase difference between said preselected timing signal and said position signal.

19. The drive system of claim 17, wherein said logic means provides said error signal only when timing signal is phase advanced with respect to said position signal.

20. The drive system of claim 1, wherein said means for providing said clocking signal comprises a voltage controlled oscillator having an input effectively connected to said error signal and producing at an output said clocking signal in response to said error signal.

21. The drive system of claim 2, wherein said means for producing a shift signal as a function of said rotation of said rotor comprises logic means responsive to said position signal for generating a serial pulse train having a frequency proportional to said rotation of said rotor.

22. The drive system of claim 21, wherein said means for producing a shift signal as a function of said rotation of said rotor further comprises:
(a) means for counting said serial pulse train for furnishing an output signal proportional to the frequency of said serial pulse train; and
(b) amplifying means responsive to said output signal proportional to the frequency of said serial pulse train for producing said shift signal as a function of said output signal.

23. The drive system of claim 3, wherein said means for providing a shift signal as a function of the current level of said electric power comprises:
(a) current sensing means for supplying a current signal proportional to the current level of said electric power; and
(b) amplifier means for providing said shift signal as a function of said current signal when the level of said current signal exceeds a preselected value.

24. The drive system of claim 23, wherein said current sensing means comprises:
(a) current sensing transformer means for supplying a first alternating current signal proportional to the current level of said electric power; and
(b) rectifier means for providing said current signal to said amplifier means as a rectified version of said first alternating current signal.

25. The drive system of claim 23, wherein said amplifier means includes a Zener diode means to set effectively said preselected value.

26. The drive system of claim 1, wherein said means for furnishing a position signal comprises:
(a) means for generating a first signal in accordance with the position of said rotor with respect to a first preselected stator position;
(b) means for generating a second signal in accordance with the position of said rotor with respect to a second preselected stator position; and
(c) means for generating a third signal in accordance with the position of said rotor with respect to a third preselected stator position intermediate said first and second preselected stator positions as a function of a phasor addition of said first signal and said second signal.

27. The drive system of claim 4, wherein said direct mode means further comprises preset enable means for furnishing a preset enable signal as a function of the frequency value of said position signal when said rotation of said rotor is below said preselected value, and wherein said means for providing said timing signals provides said timing signals as a function of said position signal in response to said preset enable signal.

28. The drive system of claim 6, wherein said direct mode means comprises:

(a) preset enable means for furnishing a preset enable signal as a function of the frequency value of said position signal when said rotation of said rotor is below said preselected value;

(b) first logic means for providing said other timing signal in accordance with said clocking signal;

(c) second logic means having an input connected to an output of said first logic means for supplying said first timing signal in accordance with said second position signal when said preset enable signal is present; and (d) third logic means having an input connected to said output of said first logic means for furnishing said second timing signal in accordance with said clocking signal.

29. The drive system of claim 7, wherein said means for generating a shift signal comprises logic means having inputs effectively connected to said preselected timing signal and said position signal, respectively, and an output effectively providing said shift signal proportional to said phase difference.

30. A variable speed constant frequency motor/generator system comprising:

(a) a DC field motor having a rotor and a plurality of stator windings;

(b) a source of multiphase electric power;

(c) cycloconverter means connected to said source of multiphase electric power for supplying electric power to said stator windings in accordance with gating signals, said cycloconverter means including banks of oppositely poled conduction controlled rectifying devices;

(d) means for generating said gating signals for said cycloconverter means in accordance with timing signals;

(e) means for providing said timing signals in response to a clocking signal;

(f) means for furnishing a position signal as a function of the position of said rotor with respect to a preselected stator position;

(g) means for generating an error signal proportional to the phase difference between a preselected timing signal and said position signal; and (h) means for producing said clocking signal as a function of said error signal.

31. The variable speed constant frequency motor/generator system of claim 30, further comprising:

(a) means for producing a shift signal as a function of said rotation of said rotor; and (b) means for adding said shift signal to said error signal effectively to cause said preselected timing signal to be advanced with respect to said position signal.

32. The variable speed constant frequency motor/generator system of claim 30, further comprising:

(a) means for providing a shift signal as a function of the current level of said electric power; and (b) means for adding said shift signal to said error signal effectively to cause said preselected timing signal to be advanced with respect to said position signal.

33. The variable speed constant frequency motor/generator system of claim 30, further comprising direct mode means for causing said timing signals to be provided to said means for generating said gating signals in accordance with said position signal when said rotation of said rotor is below a preselected value.

34. The variable speed constant frequency motor/generator system of claim 33, further comprising counter means for providing to said means for generating an error signal a signal indicative of said preselected timing signal when said rotation of said rotor is below said preselected value.

35. The variable speed constant frequency motor/generator system of claim 30, further including direct mode means for causing a first timing signal to be provided to said means for generating said gating signals in accordance with said position signals and for causing at least a second timing signal to be provided to said means for generating said gating signal whereby said gating signal is a function of the phase difference between said second timing signal and said position signals when said rotation of said rotor is below a preselected value.

36. The variable speed constant frequency motor/generator system of claim 30, further comprising:

(a) means for generating a shift signal as a function of the phase difference between said preselected timing signal and said position signal; and (b) means for adding said shift signal to said error signal effectively to cause said preselected timing signal to be advanced with respect to said position signal.

37. The variable speed constant frequency motor/generator system of claim 30, wherein said rotor is fabricated at least partially from samarium cobalt.

38. A drive method for a multiphase DC field motor having a rotor and a plurality n of stator windings representing n machine phases, said drive method comprising the steps of:

(a) supplying electric power sequentially to said n stator windings in response to gating signals, (b) generating said gating signals in response to timing signals which are a function of the relative positions of the rotor with selected ones of the n stator windings;

(c) generating n timing signals in response to clocking signals;

(d) furnishing m position signals as a function of the position of said rotor with respect to a plurality of preselected stator positions m, where the preselected stator positions m are lesser in number than the n stator windings;

(e) generating error signals proportional to the phase difference between a selected ones of the timing signals and said m position signals;

(f) producing said clocking signals as a function of said error signals, (g) deriving additional timing signals representative of intermediate rotor positions from said clocking signal to produce a total of n timing signals from error signals derived from the m positional signals and the preselected timing signals.

39. The drive method of claim 38, further comprising the steps of:

(a) producing a shift signal as a function of said rotation of said rotor; and (b) adding said shift signal to said error signal effectively to cause said preselected timing signal to be advanced with respect to said position signal.

40. The drive system of claim 38, further comprising the steps of:

(a) providing a shift signal as a function of the current level of said electric power; and (b) adding said shift signal to said error signal effectively to cause said preselected timing signal to be advanced with respect to said position signal.

41. The drive method of claim 38, further comprising the step of causing said timing signals to be provided to said means for generating said gating signals in accordance with said position signal when said rotation of said rotor is below a preselected value.

42. The drive method of claim 38, wherein said step of generating an error signal is absent, and further comprising the step of causing a first timing signal to be provided to said means for generating said gating signals in accordance with said position signal and causing at least one other timing signal to be provided to said means for generating said gating signal in accordance with said error signal generated as a function of the phase difference between a second timing signal and said position signal when said rotation of said rotor is below a preselected value.

43. A method for operating a variable speed, constant frequency motor/generator comprising the steps of (a) connecting a cycloconvertor means between a source of electric power and a DC field motor having a rotor and a plurality stator windings for supplying electric power sequentially to said stator windings;

(b) supplying gating signals to said cycloconvertor for sequentially supplying power to said stator windings;

(c) generating gating signals for said cycloconverter means in in response to timing signals equal in number to the stator windings;

(d) generating said timing signals in accordance with clocking signals (e) furnishing position signals as a function of said rotor with respect to a plurality of preselected stator winding positions;

(f) generating an error signal proportional to the average of the phase differences between preselected ones of said timing signals and said position signals; and (g) producing clocking signals as a function of said averaged error signal.

* * * * *